(12) United States Patent
Wang et al.

(10) Patent No.: US 12,081,316 B2
(45) Date of Patent: Sep. 3, 2024

(54) INTRA-SATELLITE HANDOVER

(71) Applicant: QUALCOMM Incorporated, San Diego, CA (US)

(72) Inventors: Xiao Feng Wang, San Diego, CA (US); Iyab Sakhnini, San Diego, CA (US); Jun Ma, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 16/059,585

(22) Filed: Aug. 9, 2018

(65) Prior Publication Data
US 2020/0052782 A1 Feb. 13, 2020

(51) Int. Cl.
| | |
|---|---|
| H04B 7/185 | (2006.01) |
| H04W 74/00 | (2009.01) |
| H04W 76/11 | (2018.01) |
| H04W 76/27 | (2018.01) |
| H04W 84/06 | (2009.01) |

(52) U.S. Cl.
CPC ...... *H04B 7/18541* (2013.01); *H04W 74/006* (2013.01); *H04W 76/11* (2018.02); *H04W 76/27* (2018.02); *H04W 84/06* (2013.01)

(58) Field of Classification Search
CPC . H04B 7/18541; H04B 7/1851; H04W 76/11; H04W 76/27; H04W 74/006; H04W 84/06; H04W 74/002
See application file for complete search history.

(56) References Cited

U.S. PATENT DOCUMENTS

| | | | |
|---|---|---|---|
| 6,108,538 A | * | 8/2000 | Blasiak ............... H04B 7/18541 455/428 |
| 9,887,765 B1 | * | 2/2018 | Freedman ............... H04W 8/22 |
| 9,888,426 B2 | | 2/2018 | Ulupinar et al. |

(Continued)

FOREIGN PATENT DOCUMENTS

| | | |
|---|---|---|
| CN | 102892164 A | 1/2013 |
| CN | 103428782 A | 12/2013 |

(Continued)

OTHER PUBLICATIONS

Taiwan Search Report—TW108128512—TIPO—Aug. 25, 2022.
(Continued)

*Primary Examiner* — Nizam U Ahmed
(74) *Attorney, Agent, or Firm* — Holland & Hart LLP

(57) ABSTRACT

Methods, systems, and devices for wireless communications are described that support techniques for intra-satellite handover. The described techniques provide for handovers such that a user equipment (UE) may transition from communications with a satellite via a first frequency (or set of frequencies) to communications with the same satellite via a second frequency (or set of frequencies). A UE may determine relevant timing and/or configuration for the second frequency (or set of frequencies) prior to transitioning from communications via the first frequency (or set of frequencies). Thus, the UE may efficiently begin communications at a second frequency (or set of frequencies) that are different than the first frequency (or set of frequencies)—for example, without performing a random access procedure.

37 Claims, 18 Drawing Sheets

(56) References Cited

U.S. PATENT DOCUMENTS

| | | | | |
|---|---|---|---|---|
| 2011/0105126 | A1* | 5/2011 | Liang | H04B 7/18541 455/437 |
| 2012/0083288 | A1* | 4/2012 | Siomina | H04W 64/00 455/456.1 |
| 2013/0259010 | A1* | 10/2013 | Jechoux | H04W 72/02 370/336 |
| 2015/0024677 | A1* | 1/2015 | Gopal | H04L 67/12 455/13.1 |
| 2015/0282155 | A1* | 10/2015 | Webb | H04W 72/0453 370/329 |
| 2016/0192420 | A1* | 6/2016 | Kim | H04W 74/002 370/329 |
| 2016/0323032 | A1* | 11/2016 | Ulupinar | H04B 7/1851 |
| 2016/0323800 | A1* | 11/2016 | Ulupinar | H04B 7/18541 |
| 2016/0381699 | A1* | 12/2016 | Rubin | H04W 36/02 370/329 |
| 2017/0288769 | A1* | 10/2017 | Miller | H04B 7/212 |
| 2018/0097561 | A1* | 4/2018 | Wharton | H04B 7/2041 |
| 2018/0124733 | A1* | 5/2018 | Vilaipornsawai | H04W 64/00 |
| 2018/0183551 | A1* | 6/2018 | Chou | H04L 5/0098 |
| 2018/0324715 | A1* | 11/2018 | Ryoo | H04L 5/0053 |
| 2019/0044611 | A1* | 2/2019 | Treesh | H04B 7/2041 |
| 2019/0356444 | A1* | 11/2019 | Noh | H04L 5/0023 |
| 2019/0364523 | A1* | 11/2019 | Wei | H04W 48/10 |
| 2020/0059345 | A1* | 2/2020 | Pelletier | H04W 74/006 |
| 2020/0196263 | A1* | 6/2020 | Heyn | H04W 56/0005 |
| 2020/0252838 | A1* | 8/2020 | Akdeniz | H04W 76/11 |
| 2020/0374058 | A1* | 11/2020 | Wang | H04L 5/0007 |

FOREIGN PATENT DOCUMENTS

| | | |
|---|---|---|
| CN | 105142190 A | 12/2015 |
| EP | 0421698 A2 | 4/1991 |
| FR | 2720887 A1 | 12/1995 |
| WO | WO-2016179037 | 11/2016 |
| WO | WO-2018085145 A1 | 5/2018 |

OTHER PUBLICATIONS

International Search Report and Written Opinion—PCT/US2019/045691—ISA/EPO—Jan. 2, 2020.
Partial International Search Report—PCT/US2019/045691—ISA/EPO—Oct. 22, 2019.
Taiwan Search Report—TW108128512—TIPO—Mar. 25, 2023.

* cited by examiner

Wireless Communications System

INTRA-SATELLITE HANDOVER

BACKGROUND

The following relates generally to wireless communications, and more specifically to intra-satellite handover.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal-frequency-division-multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., non-terrestrial networks (NTNs)) may utilize satellites (which may broadly refer to any high-altitude platform (e.g., drones)) as relay devices between ground base stations and ground gateways. In NTNs, the satellite may be moving at a high speed relative to UEs operating within the NTN, which may be at or relatively near ground level. In some cases, the high relative speed of the satellite may result in a corresponding high relative speed of a moving coverage area provided by the satellite to a UE. Thus, the UE may undergo a high frequency of handover procedures. Improved solutions for handover procedures within NTNs may be desired.

SUMMARY

The described techniques relate to improved methods, systems, devices, and apparatuses that support intra-satellite handover. For example, the described techniques provide for a handover procedure that may include reuse of timing or other configuration information across cells or bandwidth parts supported by a satellite. That is, a user equipment (UE) may undergo a handover procedure when communicating with a satellite where the UE may transition from communicating with the satellite using a first frequency (or set of frequencies) to communicating with the satellite using a second frequency (or set of frequencies). The UE may rely on timing and configuration information determined while communicating using the first frequency (or set of frequencies) in order to determine timing and configuration information for communicating using the second frequency (or set of frequencies). This may streamline the handover procedure and allow the UE to transition from communicating with satellite via the first frequency to communicating via the second frequency with increased efficiency (e.g., with reduced signaling or use of spectral, processing, or other system or device resources by the UE or the satellite).

DETAILED DESCRIPTION

Various described techniques provide for intra-satellite handovers. For example, the techniques provide for communicating between a satellite and user equipment (UE) at a first frequency (which may be included in a first set of frequencies) and transitioning communications so that the satellite and UE may subsequently communicate at a second frequency (which may be included in a second set of frequencies) that may be different than the first frequency. The techniques may provide for methods of intra-satellite handovers that may avoid a random access procedure. In some cases, a UE may determine timing and/or configuration information for communications with a satellite using the second frequency while communicating with a satellite using a first frequency. For example, the UE may determine that the timing information for communications using the second frequency may be the same as the timing information for communications using the first frequency.

In some cases, a handover from the first frequency to the second frequency may constitute a cell handover (e.g., the first frequency and second frequency are different cells). In some other cases, a handover from the first frequency to the second frequency may constitute bandwidth part (BWP) switching within a single cell (e.g., the first and second frequencies are different BWPs within the same cell). Whether a cell handover or a BWP switch, the handover procedure may reuse timing and configuration information determined while communicating via the first frequency. For example, the UE may rely on timing and configuration information determined while communicating via the first frequency in order to determine timing and configuration information for communications using the second frequency. This may streamline the handover procedure and allow the UE to transition from communicating with satellite via the first frequency to communicating via the second frequency with increased efficiency. Further, in some cases the disclosed techniques may support the UE autonomously switching from the first frequency to the second frequency. The disclosed techniques may also support the UE switching from the first frequency to the second frequency in response to various indications by a network (e.g., received by the UE from the satellite or another network entity).

Aspects of the disclosure are initially described in the context of wireless communications systems. Aspects are then illustrated and described with reference to process flows. Aspects of the disclosure are further illustrated by and described with reference to apparatus diagrams, system diagrams, and flowcharts that relate to intra-satellite handover.

Figure 1:
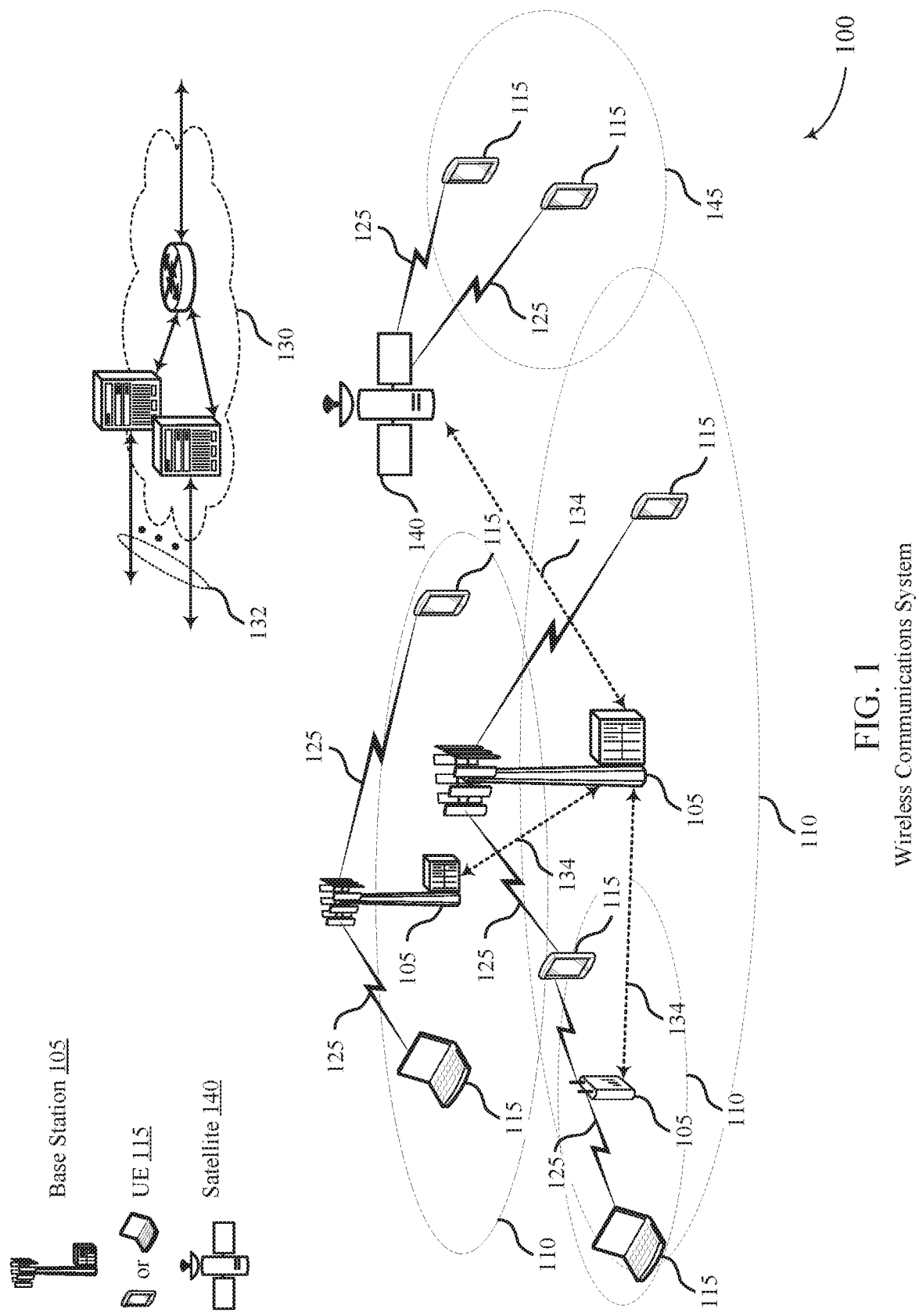
FIGS. 1 through 3 illustrate examples of a system for wireless communications that supports intra-satellite handover in accordance with aspects of the present disclosure.

FIG. 1 illustrates an example of a wireless communications system 100 that supports intra-satellite handover in accordance with aspects of the present disclosure. The wireless communications system 100 includes base stations 105, UEs 115, one or more satellites 140, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Wireless communications system 100 may be a non-terrestrial network (NTN) and may utilize one or more satellites 140 (which may broadly refer to any high-altitude platform) (e.g., as relay devices). For example, base stations 105 (or ground gateways) may wirelessly communicate with UEs 115 via one or more satellites 140 (e.g., or high-altitude platforms). The satellites 140 may relay communications between base stations 105 and UEs 115, or in some cases comprise or otherwise perform functions ascribed herein to base stations 105. Each satellite 140 may be associated with a geographical area 145 in which communications with various UEs 115 is supported. In some cases, a geographical area 145 may have properties ascribed herein to geographic coverage areas 110. Each satellite 140 may provide communication coverage for a respective geographical area 145 via communication links 125, and communication links 125 between a satellite 120 and a UE 115 may utilize one or more carriers.

Communication links 125 shown in wireless communications system 100 may include upstream transmissions from a UE 115 (e.g., to a satellite 140, to a base station 105 via satellite 140), or downstream transmissions to a UE 115 (e.g., from a satellite 140, from a base station 105 via satellite 140). In some cases, transmissions from the ground (e.g., from a UE 115 or base station 105) to a satellite 140 may be referred to as uplink transmissions and transmissions from a satellite 140 to the ground (e.g., to a UE 115 or base station 105) may be referred to as downlink transmissions. Thus, depending on whether a gateway (e.g., a base station 105) may be collocated with (e.g., included in) a satellite 140 or at the ground, either upstream or downstream transmissions may include a mix of uplink and downlink transmissions.

Downstream transmissions may also be called forward link transmissions while upstream transmissions may also be called reverse link transmissions. A geographical area 145 may be an area associated with a transmission beam of a satellite 140. In some cases, a geographical area 145 may be referred to as a beam footprint.

The geographic coverage area 110 for a base station 105 or the geographical area 145 for a satellite 140 may be divided into sectors making up only a portion of the geographic coverage area 110 or the geographical area 145, and in some cases, each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 or satellite 140 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 or geographical area 145 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). Base stations 105 may communicate with satellites 140 wirelessly over backhaul links 134 (e.g., via an X2 or other interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105, satellite 140, or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105, a satellite 140) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a satellite 140, a base station 105, or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a satellite 140 or a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105, a satellite 140, or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 or satellite 140 may be located in diverse geographic locations. A base station 105 or a satellite 140 may have an antenna array with a number of rows and columns of antenna ports that the base station 105 or the satellite 140 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105 or between a UE 115 and a satellite 140.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some cases, a carrier may be subdivided into portions, each portion having a smaller bandwidth than the carrier bandwidth (e.g., 100 MHz), and such portions may be referred to as bandwidth parts or BWPs. For example, some devices (e.g., some UEs 115) may not support the full bandwidth of a carrier, and thus may communicate using one or more BWPs. In some cases, a UE 115 may establish communications with a base station 105 or satellite 140 using a first BWP, which may be referred to as an initial BWP, and the UE 115 may thereafter switch to a different BWP. In some cases, BWPs may be paired or otherwise grouped. For example, a UE 115 may communicate using paired or grouped uplink and downlink BWPs (e.g., in an FDD implementation). Further, in some cases a UE 115 that switches to a different BWP may switch (e.g., concurrently or simultaneously or as part of a single BWP-switching operation) from a first pair or other group of BWPs to a second pair or other group BWPs.

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115, base station 105, or satellite 140 utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base stations 105 may utilize satellites 140 to relay communications to UEs 115. Due to the mobility of the satellites 140, UEs 115 communicating with satellites 140 may undergo a high frequency of handover procedures. In some cases, UEs 115 and base stations 105 may utilize a streamlined handover procedure in order to decrease overhead associated with the handover procedure.

In some examples, communications between a satellite 140 and a UE 115 may occur at a first frequency or first frequencies. The handover procedure may include the UE 115 transitioning communications to a second frequency or second frequencies, where the first and second frequencies may be different. The handover procedure may not include a retransmission of timing and configuration information (e.g., the handover may not include a random access procedure). The UE 115 may instead rely on timing and configuration information determined while communicating via the first frequency or first frequencies in order to determine timing and configuration information for communications using the second frequency or second frequencies. This may streamline the handover procedure and allow for more efficient handovers when compared to a handover procedure where satellite 140 transmits timing and configuration information to UE 115 for each frequency.

Figure 2:
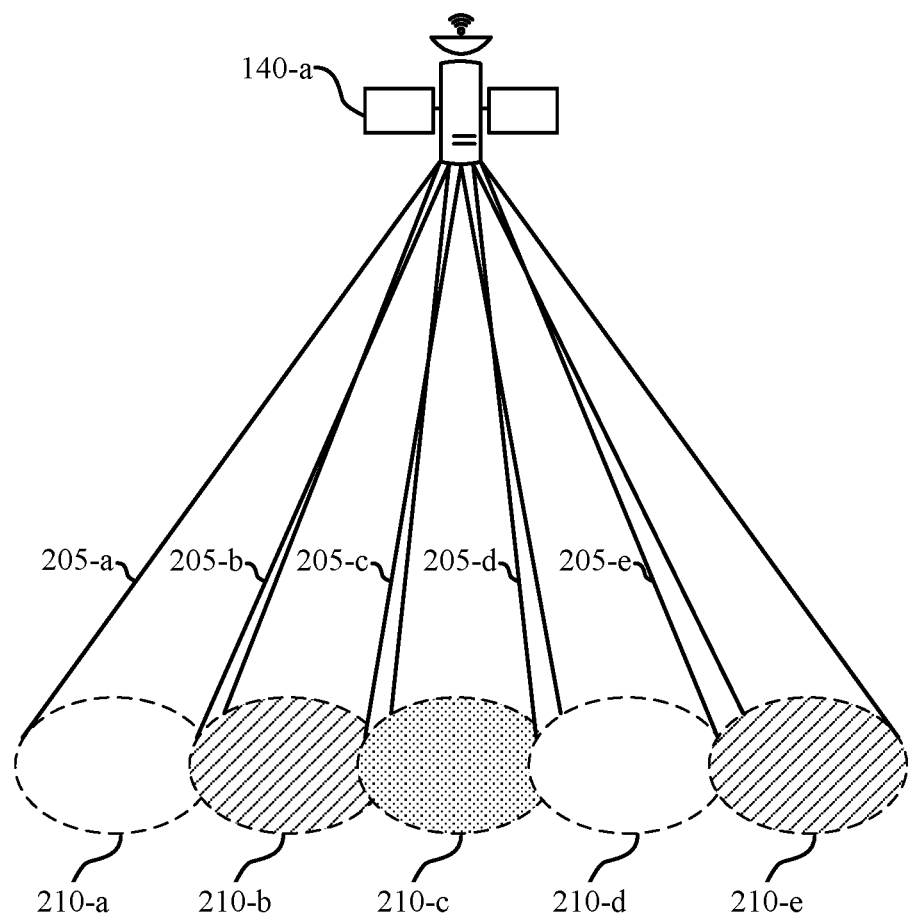

FIG. 2 illustrates an example of an NTN wireless communications system 200 that supports intra-satellite handover in accordance with aspects of the present disclosure. In some examples, wireless communications system 200 may include aspects of wireless communications system 100. For example, wireless communications system 200 may include satellite 140-*a* which may be an example of a satellite 140 as described with reference to FIG. 1.

As described herein, satellite 140-*a* may utilize any number of beam transmissions for ground communications. In some cases, satellite 140-*a* may use beams 205 for ground communications. Each beam 205 may be associated with a beam footprint 210, and various devices (e.g., UEs 115) located in a beam footprint 210 may communicate with satellite 140-*a* via the corresponding beam 205. The area spanned by a summation of the beam footprints 210 of the beams 205 supported by satellite 140-*a* (e.g., the area spanned by beam footprints 205-*a*, 205-*b*, 205-*c*, 205-*d*, and 205-*e*) may be an example of a geographic area 145 as described with reference to FIG. 1.

Satellite 140-*a* may use different frequencies between one or more of beams 205. That is, each of the beams 205 utilized for ground communications by satellite 140-*a* may not be the same frequency. For example, satellite 140-*a* may use beams 205 which each may operate on one of any number of different frequencies.

In some cases, each beam 205 may constitute an individual cell. For example, beams 205-*a*, 205-*b*, 205-*c*, 205-*d*, and 205-*e* may each constitute one of five cells supported by satellite 140-*a*.

In some cases, a set of beams 205 may constitute a cell. For example, each frequency may define a cell, and beams 205 having the same frequency may thus constitute a single cell. For example, beams 210-*a* and 210-*d* may constitute one cell that operates at a first frequency, beams 210-*b* and 210-*e* may constitute a different cell that operates at a second frequency, and beam 210-*c* may constitute its own cell operating at a third frequency.

In some cases, a set of beams 205 having different frequencies 205 may constitute a single cell, and each beam 205 within the single cell may comprise a BWP of the single cell. For example, beams 205-a, 205-b and 205-c may constitute one cell, where each beam 205 within the cell constitutes a BWP within the cell.

In some cases, each satellite 140-a may constitute a cell, and each beam 205 or frequency may define a BWP. For example, beams 210-a and 210-d may in some cases constitute a first BWP that operates at a first frequency, beams 210-b and 210-e may in some cases constitute a second BWP that operates at a second frequency, and beam 210-c may in some cases constitute a third BWP operating at a third frequency.

In some cases, the number of frequency bands utilized by satellite 140-a may be referred to as a frequency reuse factor. Here, satellite 140-a may simultaneously transmit five beams 205 with a frequency reuse factor of three, indicating that satellite 140-a may utilize one of three different frequency bands for each beam 205, and a maximum of two beams 205 may use the same frequency. However, wireless communications system 200 may not be limited to five beams 205 with a frequency reuse factor of three and may instead have more or fewer beams 205 and/or a higher or lower frequency reuse factor. In some aspects, beams 205 of different frequency bands may interfere with each other less than beams 205 of the same frequency band. For example, beams 205-a and 205-b, which utilize different frequency bands (a first frequency and a second frequency respectively) may experience and/or cause less interference between each other when compared to beams 205-a and 205-d, which utilize the same frequency band in the first frequency.

In some cases, satellite 140-a may be moving relative to a ground device in communication with satellite 140-a via a beam 205. For example, satellite 140-a may be in a non-geostationary orbit, such as a low earth orbit (LEO). In some cases, satellite 140-a may orbit the earth more than one time per day. In some cases, the relative motion of satellite 140-a when compared to a ground device may result in a corresponding relative motion of beam footprints 210. That is, as satellite 140-a moves relative to a ground device (e.g., a UE 115), beam footprint 210-d may move to a location previously associated with beam footprint 210-e. In this example, a device located at the location first associated with beam footprint 210-d and then associated with beam footprint 210-e may switch communications from beam 205-d to beam 205-e. The device, in addition to establishing communications with a different beam 205, may establish communications using one or more different frequency. In some cases, as described herein, the device may establish communications with a different frequency without undergoing a random access procedure (e.g., by reusing timing or other configuration information obtained while communicating using a prior frequency).

Figure 3:
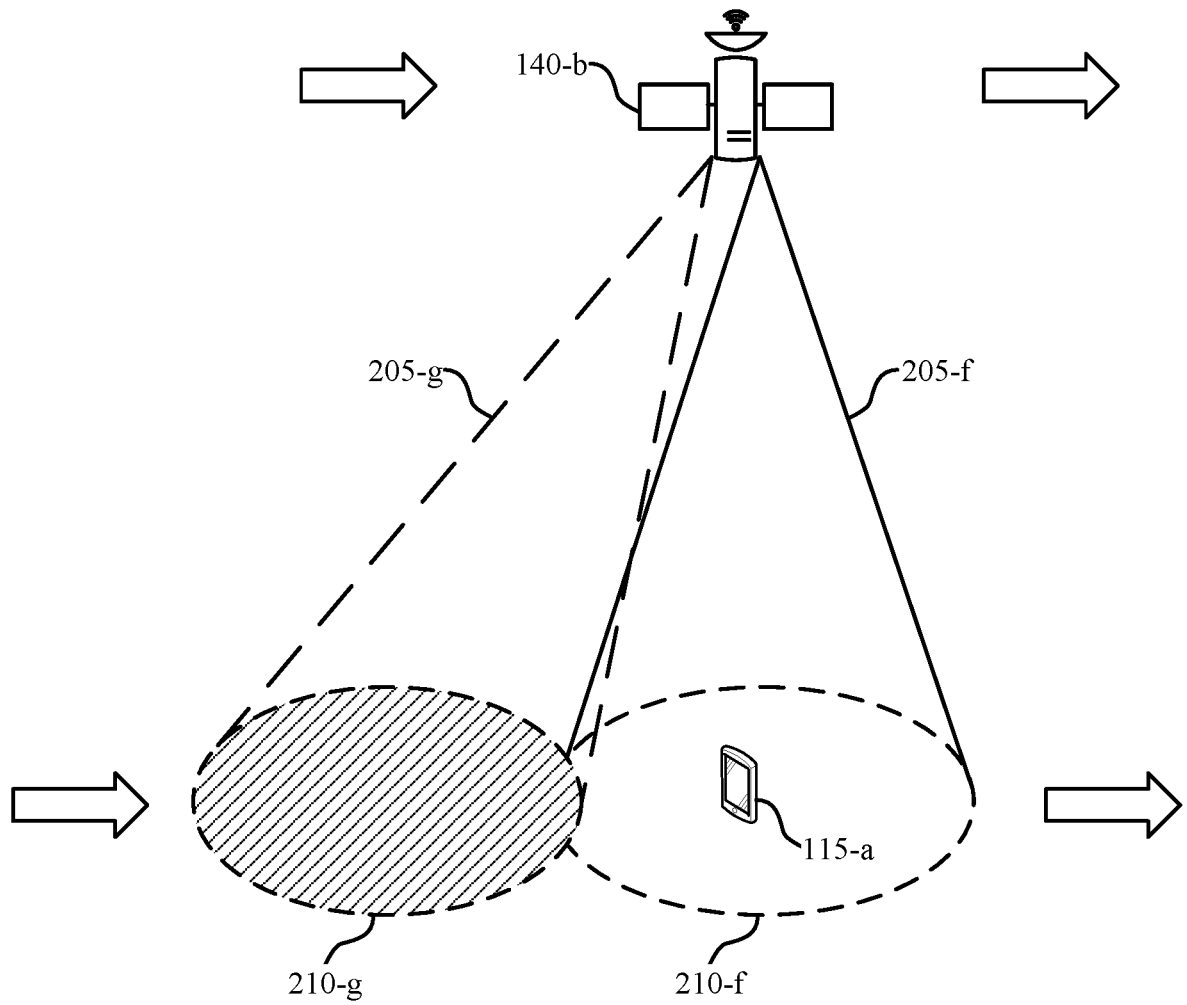

FIG. 3 illustrates an example of an NTN wireless communications system 300 that supports intra-satellite handover in accordance with aspects of the present disclosure. In some examples, wireless communications system 200 may include aspects of wireless communications system 100 and 200. Wireless communications system 300 includes a satellite 140-b which may be an example of satellites 140 and 140-a as described with reference to FIGS. 1 and 2. Further, wireless communications system 300 includes UE 115-a which may be an example of UEs 115 as described with reference to FIG. 1.

In some cases, satellite 140-b may utilize beams 205-f and 205-g for ground communications with devices such as UE 115-a. In some cases, satellite 140-b may provide communication coverage for a beam footprint 210 corresponding to the beam footprint of beams 205. Satellite 140-b may move relative to devices such as UE 115-a. For example, satellite 140-b may be in a LEO such that satellite 140-b may move at relatively high speeds in comparison to UE 115-a (e.g., 7.5 km/s). In some cases, satellite 140-b (and therefore any beams 205 supported by satellite 140-b) may move according to the arrows in wireless communications system 300. Therefore, satellite 140-b may provide communications coverage for moving beam footprints 210. In this case, beam footprints 210 may also move according to the arrows in wireless communications system 300.

UE 115-a may at one time be in communication with satellite 140-b via beam 205-f as UE 115-a may be within the beam footprint 210-a of beam 205-f. UE 115-a may be communicating via beam 205-f within a first frequency band. UE 115-a may initiate communications with satellite 140-b via a random access procedure. Satellite 140-b may transmit synchronization information for communications via beam 205-f, and UE 115-a may transmit a random access preamble, which may also be referred to as a PRACH signal or message 1 (Msg1) of the random access procedure.

In some cases, satellite 140-b may transmit the synchronization information as part of one or more of a primary synchronization signal (PSS) or a secondary synchronization signal (SSS). A PSS may be a sequence transmitted within a beam by satellite 140-b on a periodic basis and may allow a device within the corresponding beam footprint 210 (e.g., a UE 115) to achieve synchronization at a slot or TTI level of granularity. A PSS may also include some information regarding the identity of the beam 205 (e.g., within a larger group of beams 205, thus reducing the number of possible identities for the beam 205), along with information that may enable the device to locate and receive an SSS. In some cases, the PSS may be based on Zadoff-Chu (ZC) sequences or m-sequences.

Satellite 140-b may also transmit the SSS on a periodic basis, which may allow a device within the corresponding beam footprint 210 (e.g., a UE 115) to achieve synchronization at a less granular temporal level, such as at a frame level. In some cases, satellite 140-b may transmit multiple SSSs (e.g., two SSSs) within a single frame according to a pattern such that, from receiving a single SSS and identifying its place in the pattern, the receiving device may determine frame timing. An SSS sequence may be based on maximum length sequences, known as M-sequences, and may be constructed by interleaving, in the frequency-domain, two length-31 Binary Phase Shift Keying (BPSK)-modulated sequences. The two underlying length-31 sequences may themselves be two different cyclic shifts of a single length-31 M-sequence. The cyclic shift indices of the M-sequences may be derived from a function of a physical layer cell identity group that includes the cell's identity. Thus, a device (e.g., a UE 115) may be able to derive the applicable beam 205 identity group from the SSS and, combined with the identity information that the device may have obtained from the PSS, thereby determine the complete identity of the beam 205.

The synchronization information transmitted by satellite 140-b (e.g., synchronizations signals) may indicate to UE 115-a a timing configuration (or timing information) for communicating with satellite 140-b via beam 205-f. For example, the synchronization information may indicate timing configuration necessary for UE 115-a to both transmit and receive communications with satellite 140-b via beam 205-f. The synchronization information may communicate both upstream and downstream timing configurations. In some cases, UE 115-*a* may assume that communications with satellite 140-*b* via one or more other beams 205 have the same timing configuration as communications via beam 205-*f*. For example, UE 115-*a* may determine the timing information for communications with satellite 140-*b* via beam 205-*g* based on the synchronization signal sent via beam 205-*f*. In some instances, timing configuration and/or other aspects of communications via beam 205-*f* may be the same for communications via other beams 205 supported by satellite 140-*b* (e.g., beam 205-*g*). In some cases, satellite 140-*b* may indicate any differences in configuration for communications via beam 205-*f* and communications via other beams 205 supported by satellite 140-*b* (e.g., beam 205-*g*).

Satellite 140-*b* may transmit radio resource management (RRM) configuration information to UE 115-*a* via beam 205-*f*. The RRM configuration may include cell or BWP IDs for one or more cells or BWPs supported by satellite 140-*b*. In some instances, the RRM configuration may also include an indication of a center frequency and frequency bandwidth for the one or more cells/BWPs supported by satellite 140-*b*. The indication may be explicit or implicit. The implicit indication may include a single frequency bandwidth which UE 115-*b* may determine applies to the each of the one or more cells/BWPs supported by satellite 140-*b*.

Due to the relative motion of satellite 140-*b* and UE 115-*a*, UE 115-*a* may at some second time undergo a handover procedure between beam 205-*f* and beam 205-*g*, which may include UE 115-*a* transitioning from communicating over a first frequency associated with beam 205-*f* to communicating over a second frequency associated with beam 205-*g*. In some cases, the handover from beam 205-*f* to beam 205-*g* may constitute a cell handover (e.g., beams 205-*f* and 205-*g* may comprise different cells). In this case, signals of different beams (e.g., beams 205-*f* and 205-*g*) may be transmitted at the same time using FDM or space-division multiplexing (SDM). In some other cases, the handover from beam 205-*f* to beam 205-*g* may constitute BWP switching within a single cell (e.g., beams 205-*f* and 205-*g* may be within the same cell). In this case, BWPs that are different frequencies (e.g., beams which are different frequencies) may be transmitted at the same time or at different times. In some cases, UE 115-*a* may rely on timing and configuration information transmitted via beam 205-*f* to determine timing and configuration information for beam 205-*g* (e.g., to transmit or receive one or more initial transmissions via beam 205-*g*).

Figure 4:
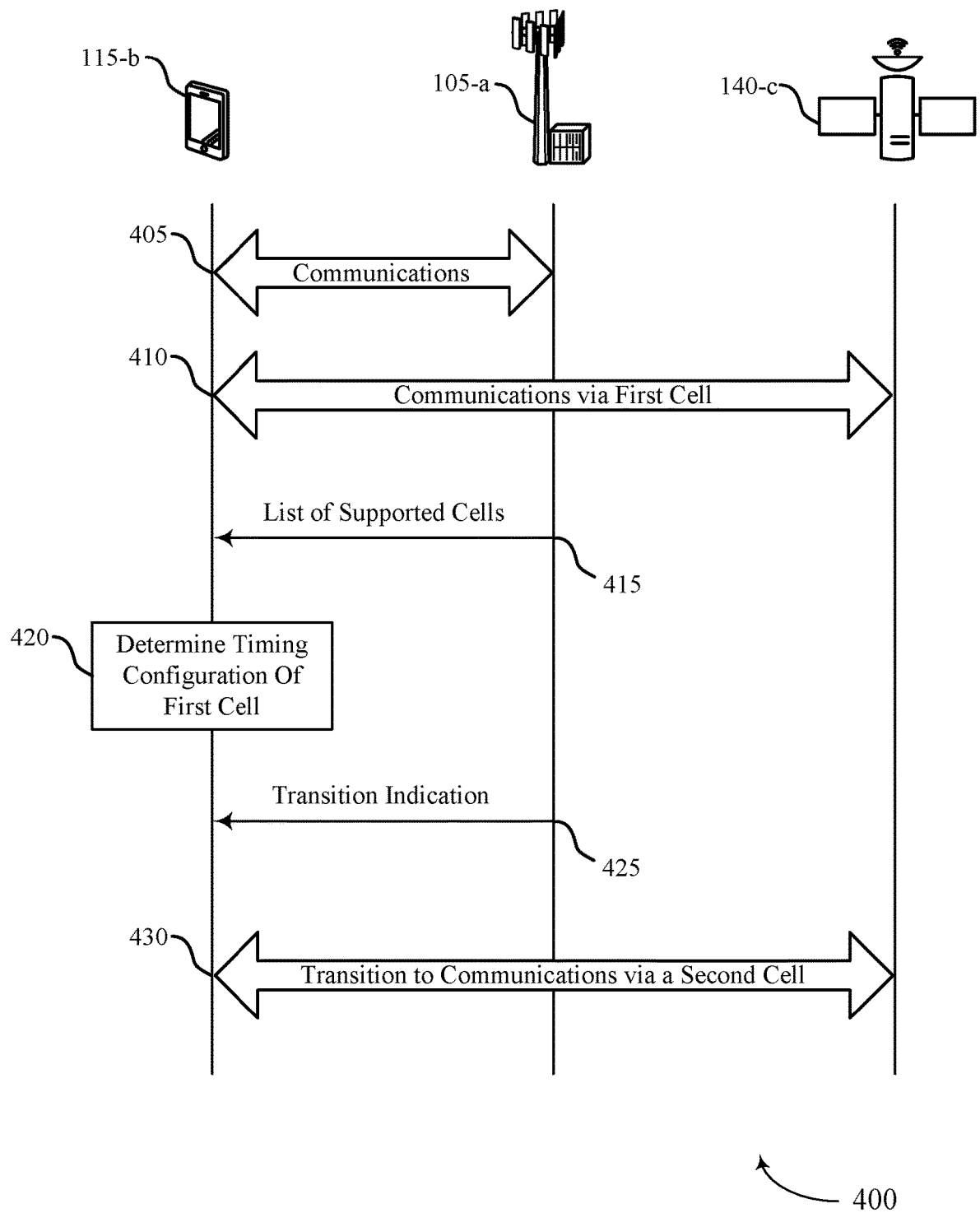
FIGS. 4 through 7 illustrate examples of process flows that support intra-satellite handover in accordance with aspects of the present disclosure.

FIG. 4 illustrates an example of a process flow 400 in a system that supports intra-satellite handover in accordance with aspects of the present disclosure. Process flow 400 may be implemented by aspects of wireless communications system 100, 200, and/or 300. Process flow 400 may include a UE 115-*b* and satellite 140-*c* which may be examples of corresponding devices as described with reference to FIGS. 1-3. Process flow 400 may further include base station 105-*a*, which may be an example of a base station 105 as described with reference to FIG. 1.

Process flow 400 may relate to a handover procedure for communications between UE 115-*b* and two different cells supported by satellite 140-*c*. In the example of process flow 400, the handover may be a network-initiated handover between cells, where each cell may either be a single beam or a set of beams operating on the same frequency. A network-initiated handover may include base station 105-*a* or another node (e.g., included in a core network, such as an MME or like entity as described with reference to FIG. 1) initiating a handover.

In the following description of process flow 400, the operations between UE 115-*b*, satellite 140-*c*, and base station 105-*a* may be performed in different orders or at different times. Certain operations may also be left out of the process flow 400, or other operations may be added to the process flow 400. It is to be understood that while UE 115-*b*, satellite 140-*c*, and base station 105-*a* are shown performing a number of the operations of process flow 400, any wireless device may perform the operations shown.

At 410, UE 115-*b* may communicate in a first cell supported by satellite 140-*c* with base station 105-*a*. In some cases, UE 115-*b* may establish communications with base station 105-*a* via the first cell supported by satellite 140-*c*. For example, satellite 140-*c* may act as a relay for communications between UE 115-*b* and base station 105-*a*. In some other cases, base station 105-*a* may be hosted on satellite 140-*c*. That is, though shown as a separate entity, base station 105-*a* may be in some cases physically included in satellite 140-*c*. In some cases, satellite 140-*c* may perform one or more of the functions ascribed to base station 105 as described with reference to FIG. 1 (e.g., as opposed to acting as a relay).

In some cases, UE 115-*b* may initiate communications in the first cell supported by satellite 140-*c* via a random access procedure. Satellite 140-*c* may transmit a synchronization signal for the first cell (e.g., a PSS or SSS), and UE 115-*b* may transmit a PRACH signal in the first cell. Once UE 115-*b* establishes communications with satellite 140-*c* via the first cell, satellite 140-*c* may transmit additional information (e.g., independently or at the direction of (e.g., relayed from) base station 105-*a*) to UE 115-*b*. For example, satellite 140-*c* may transmit RRM configuration information to UE 115-*b*. Additionally or alternatively, satellite 140-*c* may transmit, via a downstream control channel (e.g., as part of a downlink control information (DCI) message), a grant for a shared channel. The grant may include a cell identifier (ID) for a cell corresponding to the grant (e.g., for the first cell). In some cases, the grant may grant UE 115-*b* shared resources within the indicated cell (e.g., resources of a shared channel within the indicated cell).

At 415, UE 115-*b* may receive, via satellite 140-*c*, a list of a plurality of cells supported by satellite 140-*c*. The list may include at least the first cell and a second cell supported by satellite 140-*c*. The first cell and second cells may support communications sent via distinct frequencies such that communications in the first cell include a distinct frequency than communications in the second cell. In some examples, the first cell may correspond to a first beam transmitted by satellite 140-*c* and the second cell may correspond to a second beam transmitted by satellite 140-*c*. In some other examples, the first cell may correspond to a first set of one or more beams transmitted by satellite 140-*c* at a first frequency and the second cell may correspond to a second set of one or more beams transmitted by satellite 140-*c*.

In some instances, satellite 140-*c* may transmit the list of the plurality of cells as RRM configuration information. Additionally or alternatively, satellite 140-*c* may transmit the list of the plurality of cells as part of a DCI message or a MAC control element (MAC-CE). The list may include the cell IDs of each of the plurality of cells supported by satellite 140-*c*. In some examples, the list may be an ordered and indexed list of cells. The list may include additional information (e.g., more than just a cell ID for the plurality of cells supported by satellite 140-*c*). For example, the list may indicate time and frequency resources (e.g., center frequencies, bandwidths) of the plurality of cells. The list, or other information signaled by satellite 140-*c*, may further include indications of time limits or stop times for UE 115-*b* communicating within the listed cells (e.g., based on known movement of satellite 140-*c*, UE 115-*b* may receive from satellite 140-*c* an indication of time durations or start and stop times for communicating using different cells supported by satellite 140-*c*).

In some examples, UE 115-*b* may monitor the channel quality of the plurality of cells supported by satellite 140-*c* (e.g., the cells included in the list), including the cell currently used by the UE 115-*b* and one or more additional cells. That is, UE 115-*b* may utilize radio link monitoring (RLM) for the plurality of cells. UE 115-*b* may transmit channel quality information regarding the first cell and one or more other cells (e.g., at least a second cell) supported by satellite 140-*c*.

At 420, UE 115-*b* may determine a timing configuration of the first cell of the satellite 140-*c*. In some cases, UE 115-*b* may determine the timing configuration of the first cell of satellite 140-*c* based at least in part on one or more synchronization signals for the first cell. The synchronization signal may indicate timing configuration information for one or more of upstream and downstream communications via the first cell between UE 115-*b* and satellite 140-*c*. UE 115-*b* may further assume the same timing for each of the plurality of cells supported by satellite 140-*c*.

At 425, UE 115-*b* may receive an indication from satellite 140-*c* to transition to the second cell supported by satellite 140-*c*. The indication may, for example, be transmitted by satellite 140-*c* independently or at the direction of (e.g., relayed from) base station 105-*a*. In some examples, satellite 140-*c* may transmit the indication via a downstream control channel (e.g., a channel containing DCI). For example, the DCI may include a grant for a shared channel, where the grant includes a cell ID. In some cases, satellite 140-*c* may transmit a cell ID within each grant. In some cases, satellite 140-*c* may transmit a cell ID within a grant only in the event of a transition, which may conserve resources when a transition is not indicated. In some cases, the cell ID may correspond to a current cell for communication (e.g., the first cell) indicating to UE 115-*b* not to transition from the current cell. In some other cases, the cell ID may correspond to a new cell for communication (e.g., the second cell) indicating to UE 115-*b* to transition to the new cell. The indication to transition may be that the grant includes a cell ID of a cell other than the first cell (e.g., of the second cell).

In some other examples, satellite 140-*c* may indicate the transition to UE 115-*b* via a MAC-CE, which may include a cell ID for the second cell. In this example, base station 105-*a* may indicate to satellite 140-*c* to transmit the indication via MAC-CE in the case that UE 115-*b* may transition to the second cell. That is, satellite 140-*c* may not transmit cell ID information within a MAC-CE if UE 115-*a* is to continue communications with satellite 140-*c* via the first cell. In some instances, this may utilize less resources than if the MAC-CE indicated a cell ID for communication to UE 115-*b* regardless of a transition.

In some instances, base station 105-*a* or satellite 140-*c* may determine for UE 115-*b* to transition from the first cell to the second cell. For example, base station 105-*a* or satellite 140-*c* may determine for a transition based on a time limit. In this example, base station 105-*a* or satellite 140-*c* may know the location of UE 115-*b* and an associated time limit for communications within a single cell (e.g., based on known movement of the satellite 140-*c*). In this example, the indication may include an indication of a time limit (e.g., as indicated at 415) for the UE 115-*b* to communicate within the first cell of satellite 140-*c*. UE 115-*b* may identify the second cell based at least in part on an ordered sequence of cells within the plurality of cells supported by satellite 140-*c*, which may be transmitted by the satellite 140-*c* to the UE 115-*b* (e.g., as indicated at 415). Thus, in some cases, UE 115-*b* may interpret an indicated time limit or stop time for communicating with the first cell as an indication to transition. UE 115-*b* may also interpret an indicated ordered sequence of cells as an indication of the cell to which to transition.

In some other examples, base station 105-*a* or satellite 140-*c* may determine for UE 115-*b* to transition based on channel quality indicators (e.g., regardless if base station 105-*a* knows the location of UE 115-*b*) received from UE 115-*b* regarding the first and second cells. That is, base station 105-*a* or satellite 140-*c* may determine for UE 115-*b* to transition from the first cell to the second cell if the second cell has a higher reported channel quality (which may result at least in part from movement of satellite 140-*c*).

At 430, UE 115-*b* may transition from the first cell to communicating in the second cell supported by satellite 140-*c* based at least in part on the indication and the timing configuration of the first cell. For example, UE 115-*b* may determine the timing information for the second cell as being the same as the timing information that UE 115-*b* previously determined for the first cell and may transmit one or more signals in the second cell based on the timing of the first cell, including without an intervening random access or other synchronization procedure for the second cell. In some cases, UE 115-*b* may know the timing information, RRM configuration information, and frequency information of the second cell prior to receiving the indication to transition to the second cell at 425. For example, UE 115-*b* may receive, from satellite 140-*c* and prior to receiving the indication to transition to the second cell, an indication of a frequency of the second cell, where transitioning from the first cell to communication in the second cell supported by satellite 140-*c* may be based at least in part on the indication of the frequency of the second cell. In some cases, base station 105-*a* may signal, via satellite 140-*c*, to UE 115-*b* if configuration information for the second beam is different from configuration information for the first beam (e.g., different frequency bandwidths, etc.).

Figure 5:
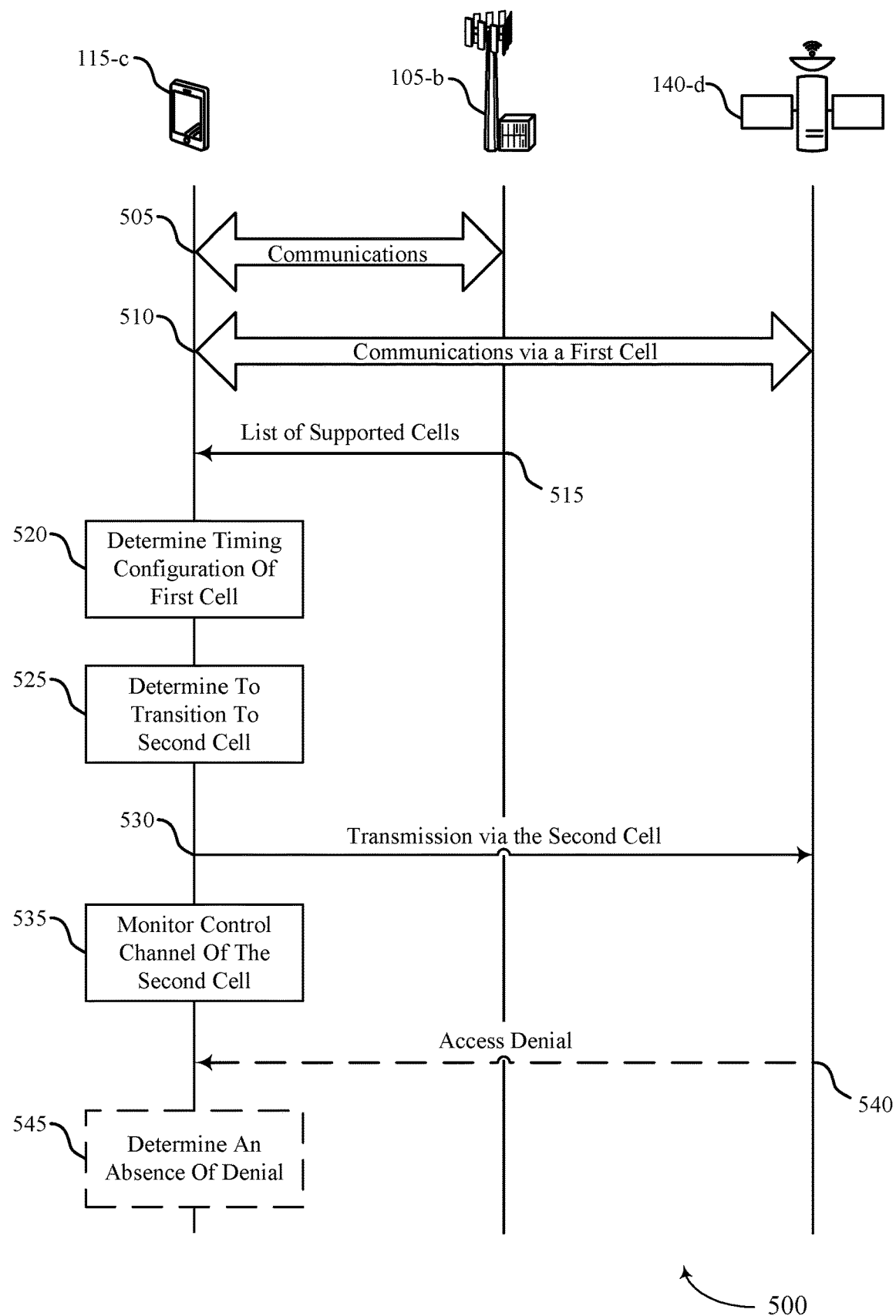

FIG. 5 illustrates an example of a process flow 500 in a system that supports intra-satellite handover in accordance with aspects of the present disclosure. Process flow 500 may be implemented by aspects of wireless communications system 100, 200, and/or 300. Process flow 500 may include a UE 115-*c* and satellite 140-*d* which may be examples of corresponding devices as described with reference to FIGS. 1-3. Process flow 500 may further include base station 105-*b*, which may be an example of a base station 105 as described with reference to FIG. 1.

Process flow 500 may relate to a handover procedure for communications between UE 115-*c* and two different cells supported by satellite 140-*d*. In the example of process flow 500, the handover may be a UE-initiated handover between cells, where each cell may either be a single beam or a set of beams operating on the same frequency.

In the following description of process flow 500, the operations between UE 115-*c*, satellite 140-*d*, and base station 105-*b* may be performed in different orders or at different times. Certain operations may also be left out of the process flow 500, or other operations may be added to the process flow 500. It is to be understood that while UE 115-*c*, satellite 140-*d*, and base station 105-*b* are shown performing a number of the operations of process flow 500, any wireless device may perform the operations shown.

At 510, UE 115-*c* may communicate in a first cell supported by satellite 140-*d* with base station 105-*b*. In some cases, UE 115-*c* may establish communications with base station 105-*b* via the first cell supported by satellite 140-*d*. For example, satellite 140-*d* may act as a relay for communications between UE 115-*c* and base station 105-*b*. In some other cases, base station 105-*b* may be hosted on satellite 140-*d*. That is, though shown as a separate entity, base station 105-*b* may in some cases be physically included in satellite 140-*d*. In some cases, satellite 140-*d* may perform one or more of the functions ascribed to base station 105 as described with reference to FIG. 1 (e.g., as opposed to acting as a relay).

In some cases, UE 115-*c* may initiate communications in the first cell supported by satellite 140-*d* via a random access procedure. Satellite 140-*c* may transmit a synchronization signal for the first cell (e.g., a PSS or SSS), and UE 115-*c* may transmit a PRACH signal in the first. Once UE 115-*c* establishes communications with satellite 140-*d* via the first cell, satellite 140-*d* may transmit additional information (e.g., independently or at the direction of (e.g., relayed from) base station 105-*b*). For example, satellite 140-*d* may transmit RRM configuration information to UE 115-*c*. In some instances, satellite 140-*d* may transmit location information to UE 115-*c*. That is, UE 115-*c* may determine a location of at least one of satellite 140-*d* or UE 115-*c*. Additionally or alternatively, satellite 140-*d* may transmit, via a downstream control channel (e.g., as part of a DCI message), a grant for a shared channel. The grant may include a cell ID for a cell corresponding to the grant (e.g., for the first cell). In some cases, the grant may grant UE 115-*c* shared resources within the indicated cell (e.g., resources of a shared channel within the indicated cell).

At 515, UE 115-*c* may receive, via satellite 140-*d*, a list of a plurality of cells supported by satellite 140-*d*. The list may include at least the first cell and a second cell supported by satellite 140-*d*. The first cell and second cells may support communications sent via distinct frequencies such that communications in the first cell include a distinct frequency than communications in the second cell. In some examples, the first cell may correspond to a first beam transmitted by satellite 140-*d* and the second cell may correspond to a second beam transmitted by satellite 140-*d*. In some other examples, the first cell may correspond to a first set of one or more beams transmitted by satellite 140-*d* at a first frequency and the second cell may correspond to a second set of one or more beams transmitted by satellite 140-*d*.

In some instances, satellite 140-*d* may transmit the list of the plurality of cells as RRM configuration information. Additionally or alternatively, satellite 140-*d* may transmit the list of the plurality of cells as part of a DCI and/or MAC-CE. In some examples, UE 115-*c* may monitor, while communicating in the first cell, the channel quality of the second cell supported by satellite 140-*d* (e.g., the cells included in the list), including the cell currently used by the UE 115-*c* and one or more additional cells. That is, UE 115-*c* may utilize RLM for the plurality of cells.

The list of supported cells transmitted at 515 may include the cell IDs of each of the plurality of cells supported by satellite 140-*d*. In some examples, the list may be an ordered and indexed list of cells. That is, UE 115-*c* may receive an ordered sequence of cells within the plurality of cells supported by satellite 140-*d*. The list, or other information signaled by the satellite 140-*d*, may further include indications of additional information (e.g., more than just a cell ID for the plurality of cells supported by satellite 140-*d*). For example, the list may indicate time and frequency resources (e.g., center frequencies, bandwidths) of the plurality of cells. In another example, satellite 140-*d* may further include indications of time limits or stop times for communications within each of the plurality of cells (e.g., based on known movement of satellite 140-*c*, UE 115-*b* may receive from satellite 140-*c* an indication of time durations or start and stop times for communicating using different cells supported by satellite 140-*c*). For example, UE 115-*c* may receive an indication of a time limit for communications within the first cell. In another example, the list may include an indication of a timer for one or more of the plurality of cells supported by satellite 140-*d* (e.g., a timer for each of the cells UE 115-*c* may use to communicated with satellite 140-*d*), including the cell currently used by the UE 115-*c* and one or more additional cells. The list may include or satellite 140-*d* may otherwise provide to UE 115-*c* an indexed list of transition times for each of the cells UE 115-*c* may use in communications with satellite 140-*d*. In some cases, the indexed list of transition times may align with the ordered sequence of cells such that an index number may indicate to UE 115-*c* a specific cell and an amount of time for communications within that cell.

At 520, UE 115-*c* may determine a timing configuration of the first cell of the satellite 140-*d*. In some cases, UE 115-*c* may determine the timing configuration of the first cell of satellite 140-*d* based at least in part on one or more synchronization signals for the first cell. The synchronization signal may indicate timing configuration information for one or more of upstream and downstream communications via the first cell between UE 115-*c* and satellite 140-*d*. UE 115-*c* may further assume the same timing for each of the plurality of cells supported by satellite 140-*d*.

At 525, UE 115-*c* may determine (e.g., autonomously) to transition to the second cell supported by satellite 140-*d*. In some examples, UE 115-*c* may determine to transition to the second cell based at least in part on the time limit for communications within the first cell and the ordered sequence of cells within the plurality of cells supported by satellite 140-*d*. That is, UE 115-*c* may determine that the time limit for communications within the first cell has been reached. UE 115-*c* may then determine to transition to the second cell based on the ordered sequence of cells received at 515. In some other examples, UE 115-*c* may determine to transition to the second cell based at least in part on the location of at least one of the satellite 140-*d* or UE 115-*c*. In this example, UE 115-*c* may determine that, based on the location of either satellite 140-*d* or UE 115-*c*, that communications via the second cell may be better (e.g., higher quality) than communications via the first cell. In some other examples, UE 115-*c* may determine to transition to the second cell supported by satellite 140-*d* based at least in part on the channel quality associated with the second cell. That is, UE 115-*c* may determine that a channel quality associated with the second cell may be better than a channel quality associated with the first cell.

At 530, UE 115-*c* may transmit an upstream transmission in the second cell supported by satellite 140-*d* based at least in part on the determination to transition and the timing configuration of the first cell supported by satellite 140-*d*. In some cases, transmitting the upstream transmission in the second cell includes the UE 115-*c* determining a timing configuration of an upstream control channel of the second cell based at least in part on the timing configuration of the first cell. For example, UE 115-*c* may determine the timing information for the second cell as being the same as the timing information that UE 115-*c* previously determined for the first cell and may transmit one or more signals in the second cell based on the timing of the first cell, including without an intervening random access or other synchronization procedure for the second cell. The UE 115-c may further transmit an access request (e.g., an SR using a dedicated resource) via the upstream control channel of the second cell. In some examples, the access request may include at least one of a UE ID, a cell ID for the first cell, or a cell ID for the second cell. For example, the access request may indicate a UE ID or a cell ID via resource location, sequence ID, or via a combination thereof. UE 115-c may transmit a sequence over a resource. The sequence may include a sequence ID, the resource may have a resource ID, which may in turn indicate an ID of UE 115-c and a cell ID for the first and/or second cell. For example, UE 115-c may transmit N sequences over M resources (e.g., M frequency sub-bands), which may indicate up to MxN combinations of the UE 115-c ID and first and/or second cell IDs.

At 535, UE 115-c may monitor a downstream control channel of the second cell for a denial of access to the second cell. UE 115-c may monitor, for a duration after transmitting the upstream transmission in the second cell, a downstream control channel of the second cell for a grant of resources of a shared channel of the second cell. In some cases, the duration for which UE 115-c may monitor the downstream control channel of the second cell may correspond to an RTT delay for communications between UE 115-c and satellite 140-d or a multiple thereof. For example, the duration may correspond to a time associated with transmitting a physical upstream channel message (e.g., a physical upstream shared channel (PUSCH) message) and receiving a physical downstream channel message (e.g., a physical downstream shared channel (PDSCH) message).

In some cases, at 540, UE 115-c may receive a denial of access to the second cell (e.g., via a downstream control channel of the second cell supported by satellite 140-d). In some cases, UE 115-c may determine an absence of a grant from the downstream control channel during the duration discussed above, and the absence of the grant may constitute the denial. Additionally or alternatively, the denial of access may include UE 115-c receiving a downstream control message that includes at least one of an explicit denial message or an allocation of shared resources that grants no resources to UE 115-c. For example, UE 115-c may not receive a valid downstream or upstream grant within a pre-determined period of time indicating a denial for communications with satellite 140-d in the second cell. In some other examples, UE 115-c may receive a downlink DCI message with no resource allocation or a DCI message indicating access denial. If UE 115-c receives a denial, UE 115-c may determine to return to the first cell supported by satellite 140-d based at least in part on receiving the denial. UE 115-c may then transition from the second cell to communication in the first cell supported by satellite 140-d based at least in part on the determination to return and the timing configuration of the first cell, or to transition to some other cell supported by satellite 140-d (e.g., based on one or more of channel quality measurements, time limits for cells, or the ordered sequence of cells).

Alternatively, at 545, UE 115-c may determine an absence of the denial or receive an explicit indication of approval of the transition (not shown). UE 115-c may then communicate with satellite 140-d in the second cell based at least in part on determining the absence of the denial or the explicit approval. In some cases, UE 115-c may know the timing information, RRM configuration information, and frequency information of the second cell prior to transitioning to the second cell at 425. In some cases, base station 105-b may signal, via satellite 140-d, to UE 115-c if configuration information for the second beam is different from configuration information for the first beam (e.g., different frequency bandwidths, etc.).

Figure 6:
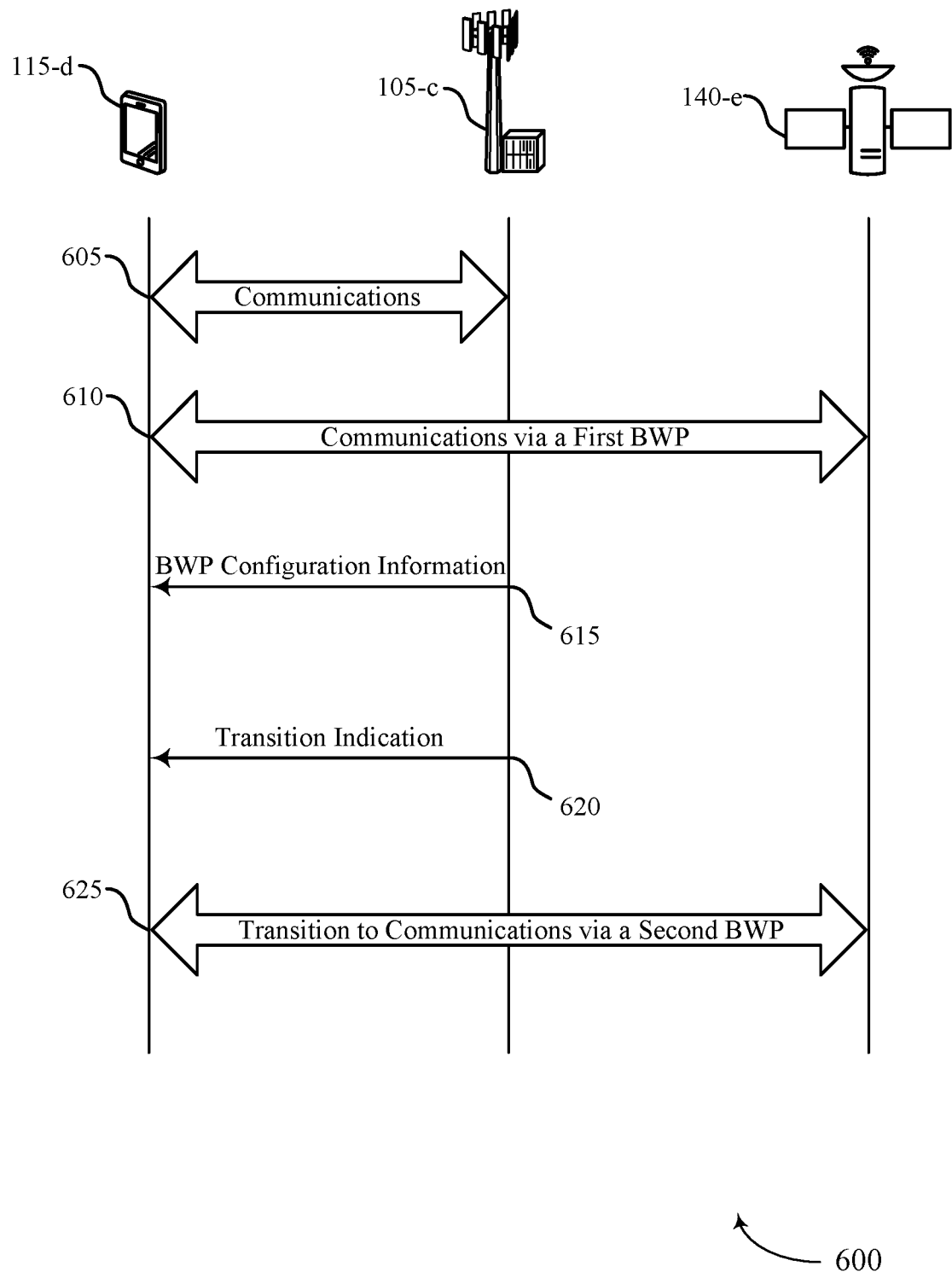

FIG. 6 illustrates an example of a process flow 600 in a system that supports intra-satellite handover in accordance with aspects of the present disclosure. Process flow 600 may be implemented by aspects of wireless communications system 100, 200, and/or 300. Process flow 600 may include a UE 115-d and satellite 140-e which may be examples of corresponding devices as described with reference to FIGS. 1-3. Process flow 600 may further include base station 105-c, which may be an example of a base station 105 as described with reference to FIG. 1.

Process flow 600 may relate to a handover procedure for communications between UE 115-d and two different BWPs supported by satellite 140-e. In the example of process flow 600, the handover may be a network-initiated handover between BWPs. A network-initiated handover may include base station 105-c or another node (e.g., included in a core network, such as an MME or like entity as described with reference to FIG. 1) initiating a handover.

In the following description of process flow 600, the operations between UE 115-d, satellite 140-e, and base station 105-c may be performed in different orders or at different times. Certain operations may also be left out of the process flow 600, or other operations may be added to the process flow 600. It is to be understood that while UE 115-d, satellite 140-e, and base station 105-c are shown performing a number of the operations of process flow 600, any wireless device may perform the operations shown.

At 610, UE 115-d communicate with base station 105-c in a cell supported by satellite 140-e via a first BWP of the cell. In some cases, UE 115-d may establish communications with base station 105-c via satellite 140-e. For example, satellite 140-e may act as a relay for communications between UE 115-d and base station 105-c. In some other cases, base station 105-c may be hosted on satellite 140-e. That is, though shown as a separate entity, base station 105-c may be physically included in satellite 140-e. In some cases, rather than act as a relay, satellite 140-e may perform one or more of the functions ascribed to base station 105 as described with reference to FIG. 1

In some cases, the first cell may include all beams transmitted by satellite 140-e. Each BWP may include one or more beams that utilize a same frequency. Alternatively, the first cell may include a subset of beams transmitted by satellite 140-e, where the subset includes BWPs spanning the frequency range for communications supported by satellite 140-e, and one or more other cells supported by satellite 140-e may be similarly configured (e.g., with one or more BWPs, which may collectively span the frequency range).

In some cases, UE 115-d may communicate with satellite 140-e using the first bandwidth part for upstream and downstream communications. For example, the communications between UE 115-d and satellite 140-e may be TDD. In some other cases, UE 115-d may communicate with satellite 140-e using the first BWP for one of upstream or downstream communications and a different BWP for the other of upstream or downstream communications. For example, the communications between UE 115-d and satellite 140-e may be FDD. In an FDD deployment, upstream and downstream BWPs may be switched simultaneously, and any teachings herein regarding switching from one BWP to another BWP may equally apply to switching from a first pair or group of BWPs (e.g., a first upstream BWP and one or more associated downstream BWPs) to a second pair or group of BWPs (e.g., a second upstream BWP and one or more associate downstream BWPs).

In some instances, UE 115-d may initiate communications with satellite 140-e via a random access procedure. That is, satellite 140-e may transmit a synchronization signal for the first BWP (e.g., a PSS or SSS), and UE 115-d may transmit a PRACH signal using the first BWP and satellite 140-e may transmit a synchronization signal for the first BWP. Once UE 115-d establishes communications with satellite 140-e using the first BWP satellite 140-e may transmit additional information (e.g., independently or at the direction of (e.g., relayed from) base station 105-c) to UE 115-d. For example, satellite 140-e may transmit, via a downstream control channel (e.g., as part of a DCI message), a grant for a shared channel. The grant may include an ID for a BWP corresponding to the grant (e.g., the first BWP of the cell). Satellite 140-e may transmit a BWP ID within each grant. In some cases, the grant may grant UE 115-d shared resources within the indicated BWP (e.g., resources of a shared channel within the indicated BWP).

At 615, UE 115-d may receive configuration information for each of a plurality of BWPs of the cell, the plurality of BWPs comprising at least the first BWP and a second BWP of the cell. That is, at 615, base station 105-c may transmit, via satellite 140-e, configuration information for each of a plurality of BWPs of the cell supported by satellite 140-e. In some cases, the first bandwidth part of the call may be one of a first set of BWPs, the first set of BWPs comprising a first pair of downstream and upstream BWPs. The second BWP of the cell may one of a second set of BWPs, the second set of BWPs comprising a second pair of downstream and upstream bandwidth parts (e.g., communications between UE 115-e and satellite 140-e utilize FDD). In some other cases, UE 115-d utilizes the same BWP of the cell for upstream communications as satellite 140-e utilizes for downstream communications (e.g., communications between UE 115-e and satellite 140-e utilize TDD). Additionally or alternatively, the first BWP of the call may correspond to a first beam transmitted by satellite 140-e at a first frequency and the second BWP of the cell may correspond to a second beam transmitted by satellite 140-e at a second frequency. That is, the first and second BWPs may support communications at distinct frequencies.

The communications via the first BWP may include satellite 140-e transmitting an ordered sequence of BWPs of the cell (e.g., as part of or in addition to the configuration information at 615). In some examples, the list may be an ordered and indexed list of BWPs. The list may include additional information (e.g., more than just a BWP ID for the plurality of BWPs of the cell supported by satellite 140-e). The list may indicate time and frequency resources (e.g., center frequencies, bandwidths) of the BWPs. This may further include indications of time limits for UE 115-d communicating using each BWP. For example, UE 115-d may receive an indication of time limits or stop times for communications using the first BWP or other BWPs of the cell. For example, base station 105-c may know a location of UE 115-d and utilize the location information to determine a time for communication with each of the plurality of BWP of the cell. UE 115-d may receive a timer for each of the BWPs in a certain order which may correspond to the ordered and indexed list of BWPs.

In some instances, UE 115-d may monitor the channel quality of the plurality of BWPs of the cell, including the BWP currently used by the UE 115-d and one or more additional BWPs. For example, UE 115-d may determine, while using the first BWP of the cell, channel quality information for the second BWP of the cell. UE 115-d may transmit, to satellite 140-e while using the first BWP of the cell, the channel quality information regarding the first BWP and one or more other BWPs (e.g., at least a second BWP of the cell). That is, UE 115-d may utilize RLM for at least two of the plurality of BWPs of the cell.

At 620, UE 115-d may receive, after receiving the configuration information for each of the plurality of BWPs of the cell, an indication to transition to the second BWP of the cell. The indication may, for example, be transmitted by satellite 140-c independently or at the direction of base station 105-c. In some examples, UE 115-d may receive an explicit indication to transition to the second BWP from base station 105-c via satellite 140-e. For example, UE 115-d may receive, via a downstream control channel (e.g., a channel containing DCI), a grant for a shared channel, where the grant includes an ID of the second BWP of the cell. Additionally or alternatively, UE 115-d may receive, from satellite 140-e, an indication to transition to the second BWP of the cell via at least one of RRC signaling or as part of a MAC-CE.

Base station 105-c or satellite 140-e may determine for UE 115-d to transition from the first BWP to the second BWP based on timer information (e.g., as it relates to an associated time limit for communications using the first BWP based on known movement of satellite 140-c) or the channel quality information received from UE 115-d (e.g., measurement reporting) regarding the second BWP. In some other examples, UE 115-d may receive an implicit indication to transition to the second BWP from base station 105-c via satellite 140-e. For example, UE 115-d may receive the indication of a time limit for communications using the first BWP of the cell, where the indication of the time limit is the indication to transition to the second BWP of the cell. UE 115-d may identify the second BWP of the cell based at least in part on the ordered sequence. Additionally or alternatively, UE may automatically switch when the time limit (or stop time) associated with the first BWP, received from base station 105-c, expires (or is reached). Thus, in some cases, UE 115-b may interpret an indicated time limit or stop time for communicating using the first BWP as an indication to transition. UE 115-b may also interpret an indicated ordered sequence of BWPs as an indication of the BWP to which to transition.

At 625, UE 115-d may transition from using the first BWP of the cell to using the second BWP of the cell based at least in part on the indication and the configuration information for the second BWP of the cell. For example, UE 115-d may determine the timing information for the second BWP as being the same as the timing information that UE 115-d previously determined for the first BWP and may transmit one or more signals using the second BWP based on the timing of the first cell, including without an intervening random access or other synchronization procedure for the second cell. In some cases, UE 115-d may know the timing information, RRM configuration information, and frequency information of the second BWP prior to receiving the indication to transition to the second BWP at 620. For example, UE 115-d may receive, from satellite 140-e and prior to receiving the indication to transition to the second BWP, an indication of a frequency of the second BWP (e.g., at 615 within the BWP configuration information). In some cases, transitioning to the second BWP of the cell may include UE 115-d communicating with satellite 140-e using the second BWP of the cell for both upstream and downstream communications (e.g., TDD communications). In some other cases, transitioning from using the first BWP of the cell to using the second BWP of the cell includes transition from using the first pair of downstream and upstream BWPs to using a second pair of downstream and upstream BWPs.

Figure 7:
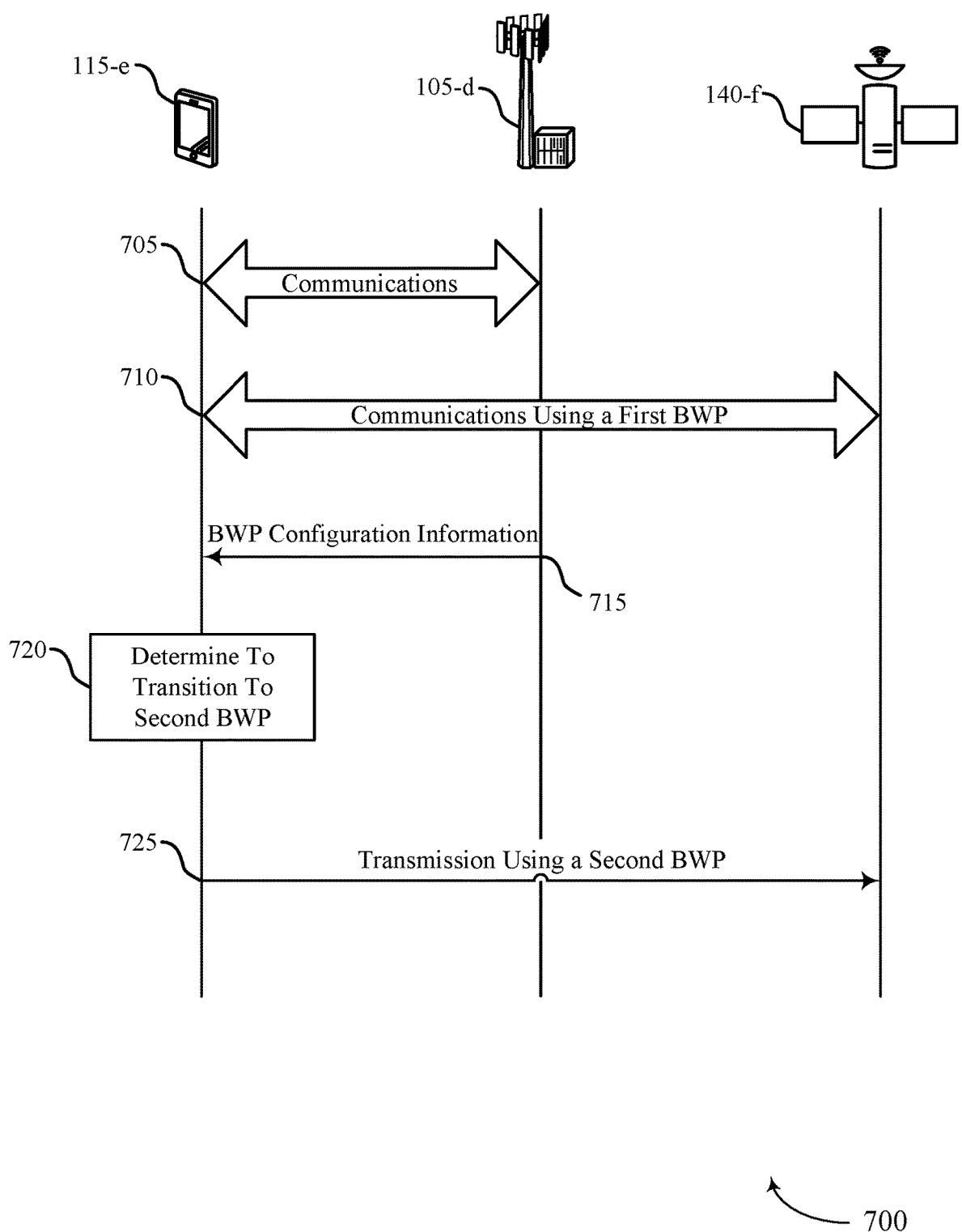

FIG. 7 illustrates an example of a process flow 700 in a system that supports intra-satellite handover in accordance with aspects of the present disclosure. Process flow 700 may be implemented by aspects of wireless communications system 100, 200, and/or 300. Process flow 700 may include a UE 115-*e* and satellite 140-*f* which may be examples of corresponding devices as described with reference to FIGS. 1-3. Process flow 700 may further include base station 105-*d*, which may be an example of a base station 105 as described with reference to FIG. 1.

Process flow 700 may relate to a handover procedure for communications between UE 115-*e* and two different BWPs supported by satellite 140-*f*. In the example of process flow 700, the handover may be a UE-initiated handover between BWPs.

In the following description of process flow 700, the operations between UE 115-*e*, satellite 140-*f*, and base station 105-*d* may be performed in different orders or at different times. Certain operations may also be left out of the process flow 700, or other operations may be added to the process flow 700. It is to be understood that while UE 115-*e*, satellite 140-*f*, and base station 105-*d* are shown performing a number of the operations of process flow 700, any wireless device may perform the operations shown.

At 710, UE 115-*e* may communicate with base station 105-*d* in a cell supported by satellite 140-*f* via a first BWP of the cell. For example, satellite 140-*f* may act as a relay for communications between UE 115-*e* and base station 105-*d*. In some other cases, base station 105-*d* may be hosted on satellite 140-*f*. That is, though shown as a separate entity, base station 105-*d* may in some cases be physically included in satellite 140-*f*. In some cases, satellite 140-*f* may perform one or more of the functions ascribed to base station 105 as described with reference to FIG. 1 (e.g., as opposed to acting as a relay).

In some cases, the first cell may include all beams transmitted by satellite 140-*f*. Each BWP may include one or more beams that utilize a same frequency. Alternatively, the first cell may include a subset of beams transmitted by satellite 140-*f*, where the subset includes BWPs spanning the frequency range for communications supported by satellite 140-*f*, and one or more other cells supported by satellite 140-*f* may be similarly configured (e.g., with one or more BWPs, which may collectively span the frequency range).

In some cases, UE 115-*e* may communicate with satellite 140-*f* using the first bandwidth part for upstream and downstream communications. For example, the communications between UE 115-*e* and satellite 140-*f* may be TDD. In some other cases, UE 115-*e* may communicate with satellite 140-*f* using the first BWP for one of upstream or downstream communications and a different BWP for the other of upstream or downstream communications. For example, the communications between UE 115-*e* and satellite 140-*f* may be FDD. In an FDD deployment, upstream and downstream BWPs may be switched simultaneously, and any teachings herein regarding switching from one BWP to another BWP may equally apply to switching from a first pair or group of BWPs (e.g., a first upstream BWP and one or more associated downstream BWPs) to a second pair or group of BWPs (e.g., a second upstream BWP and one or more associate downstream BWPs).

In some instances, UE 115-*e* may initiate communications with satellite 140-*f* via a random access procedure. That is, satellite 140-*f* may transmit a synchronization signal for the first BWP (e.g., a PSS or SSS), and UE 115-*e* may transmit a PRACH signal using the first BWP and satellite 140-*f* may transmit a synchronization signal for the first BWP. Once UE 115-*e* establishes communications with satellite 140-*f* using the first BWP, satellite 140-*f* may transmit additional information (e.g., independently or at the direction of (e.g., relayed from) base station 105-*d*) to UE 115-*e*. For example, satellite 140-*f* may transmit, via a downstream control channel (e.g., as part of a DCI message), a grant for a shared channel. The grant may include an ID for a BWP corresponding to the grant (e.g., the first BWP of the cell). Satellite 140-*f* may transmit a BWP ID within each grant. In some cases, the grant may grant UE 115-*d* shared resources within the indicated BWP (e.g., resources of a shared channel within the indicated BWP).

At 715, UE 115-*e* may receive configuration information for each of a plurality of BWPs of the cell, the plurality of BWPs comprising at least the first BWP and a second BWP of the cell. That is, at 615, base station 105-*d* may transmit, via satellite 140-*f*, configuration information for each of a plurality of BWPs of the cell supported by satellite 140-*f*. In some cases, the first bandwidth part of the call may be one of a first set of BWPs, the first set of BWPs comprising a first pair of downstream and upstream BWPs. The second BWP of the cell may one of a second set of BWPs, the second set of BWPs comprising a second pair of downstream and upstream bandwidth parts (e.g., communications between UE 115-*e* and satellite 140-*f* utilize FDD). In some other cases, UE 115-*e* utilizes the same BWP of the cell for upstream communications as satellite 140-*f* utilizes for downstream communications (e.g., communications between UE 115-*e* and satellite 140-*f* utilize TDD). Additionally or alternatively, the first BWP of the call may correspond to a first beam transmitted by satellite 140-*f* at a first frequency and the second BWP of the cell may correspond to a second beam transmitted by satellite 140-*f* at a second frequency. That is, the first and second BWPs may support communications at distinct frequencies.

The communications via the first BWP may include UE 115-*e* receiving an ordered sequence of BWPs of the cell (e.g., as part of or in addition to the configuration information at 715). In some examples, the list may be an ordered and indexed list of BWPs. The list, or other information signaled by the satellite 140-*f*, may include indications of additional information (e.g., more than just a BWP ID for the plurality of BWPs of the cell supported by satellite 140-*f*). For example, the list, or other information signaled by satellite 140-*f*, may indicate time and frequency resources (e.g., center frequencies, bandwidths) of the BWPs. This may further include an indication of time limits or stop times for UE 115-*e* communicating using each BWP. For example, UE 115-*e* may receive an indication of a time limit for communications using the first BWP of the cell. UE 115-*e* may receive a timer for each of the BWPs in a certain order which may correspond to the ordered and indexed list of BWPs.

In some instances, UE 115-*e* may monitor the channel quality of the plurality of BWPs of the cell, including the BWP currently used by the UE 115-*e* and one or more additional BWPs. For example, UE 115-*e* may determine, while using the first BWP of the cell, channel quality information for the second BWP of the cell. UE 115-*e* may transmit, to satellite 140-*f* while using the first BWP of the cell, the channel quality information for the first BWP and one or more other BWPs (e.g., at least a second BWP of the cell). That is, UE 115-*e* may utilize RLM for at least two of the plurality of BWPs of the cell.

At 720, UE 115-*e* may determine to transition (e.g., autonomously) to the second BWP of the cell. In some examples, UE 115-*c* may determine to transition to the second BWP based at least in part on the time limit for communications using the first BWP and the ordered sequence of BWPs of the cell supported by satellite 140-*d*. That is, UE 115-*c* may determine that the time limit for communications within the first BWP has been reached. UE 115-*c* may then determine to transition to the second BWP based on the ordered sequence of BWP received at during the communications at 710. In some other examples, UE 115-*c* may determine to transition to the second BWP based at least in part on the location of at least one of the satellite 140-*d* or UE 115-*c*. In this example, UE 115-*c* may determine a location of at least on of satellite 140-*f* or UE 115-*e* and determine that, based on the location of either satellite 140-*d* or UE 115-*c*, communications via the second BWP may be better (e.g., higher quality) than communications via the first BWP. In some other examples, UE 115-*c* may determine to transition to the second BWP supported by satellite 140-*f* based at least in part on the channel quality associated with the second BWP. That is, UE 115-*e* may determine that a channel quality associated with the second BWP may be better than a channel quality associated with the first BWP.

At 725, UE 115-*e* may transmit an upstream transmission using the second BWP of the cell based at least in part on the determining to transition and the configuration information for the second BWP of the cell. In some cases, UE 115-*e* may determine a configuration of an upstream control channel of the second BWP of the cell based at least in part on the configuration information for the second BWP of the cell. For example, UE 115-*e* may determine the timing information for the second BWP as being the same as the timing information that UE 115-*e* previously determined for the first BWP and may transmit one or more signals in the second BWP based on the timing of the first BWP, including without an intervening random access or other synchronization procedure for the second BWP. The upstream transmission may include transmitting an access request (e.g., transmitting an SR) via the upstream control channel of the second BWP of the cell. The access request may include at least one of UE ID, a BWP ID for the first BWP, or a BWP ID for the second BWP. For example, the access request may indicate a UE ID or a BWP ID via resource location, sequence ID, or via a combination thereof Alternatively, the upstream transmission may include a grant-free transmission via the upstream shared channel of the second BWP of the cell. UE 115-*e* may monitor the downstream control channel for a denial of access to the second BWP of the cell. In some cases, UE 115-*e* may determine an absence of denial (e.g., UE 115-*e* waits a known amount of time and does not detect a denial) and communicate with satellite 140-*f* using the second BWP. In some other cases, UE 115-*e* may receive a denial for access to the second BWP. In this case, UE 115-*a* may transition from the second BWP to the first BWP to communicate with satellite 140-*f*. In either case, the transition may not include an addition random access procedure. In some cases, UE 115-*e* may know the timing information, RRM configuration information, and frequency information of the second BWP prior to transmitting the upstream transmission at 725. For example, UE 115-*e* may receive, from satellite 140-*f* and prior to receiving the indication to transition to the second BWP, an indication of a frequency of the second BWP (e.g., at 715 within the BWP configuration information). Further, UE 115-*e* may determine the timing information for the second BWP as being the same as the timing information for the first BWP.

Figure 8:
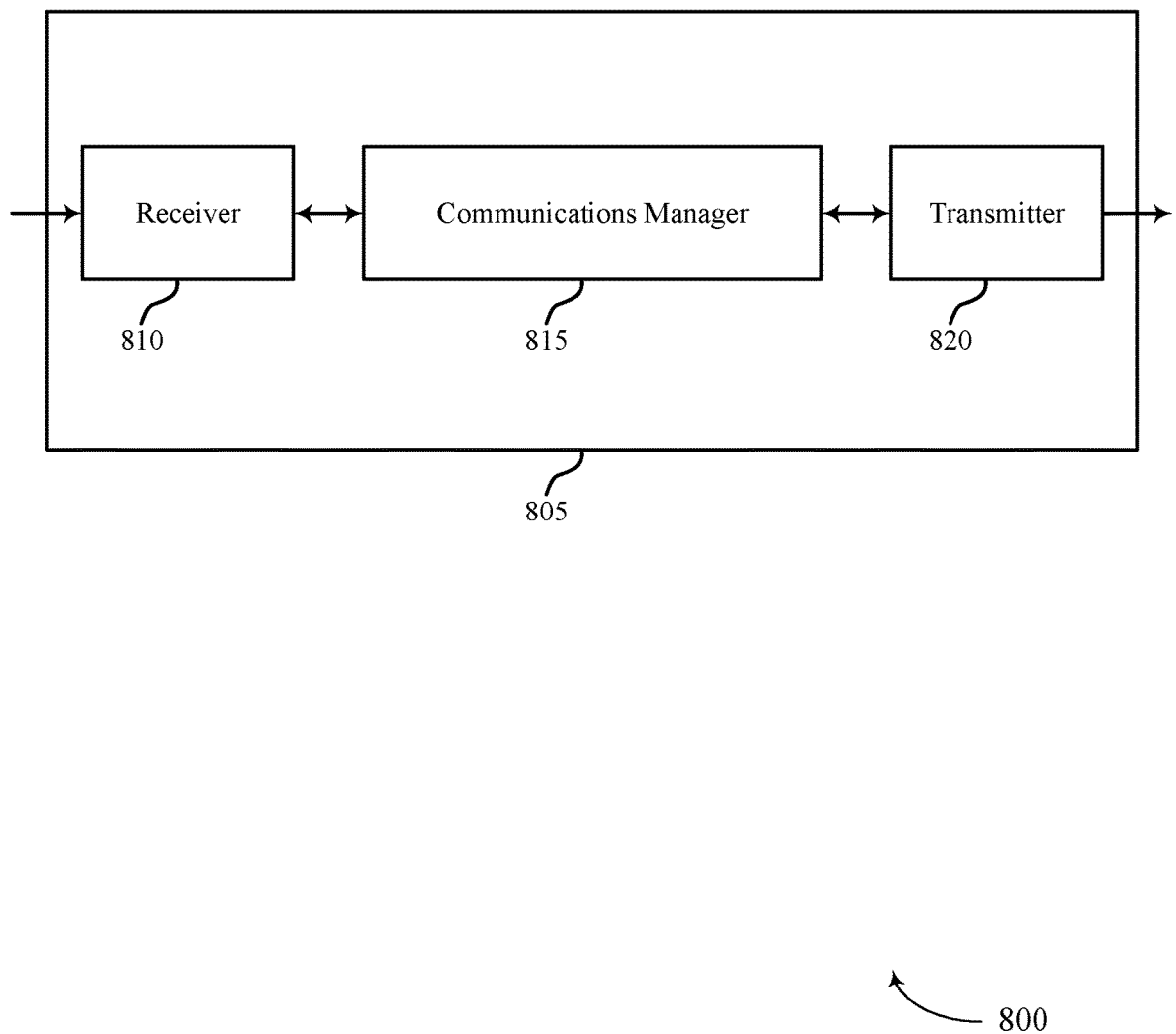
FIGS. 8 and 9 show block diagrams of devices that support intra-satellite handover in accordance with aspects of the present disclosure.

FIG. 8 shows a block diagram 800 of a device 805 that supports intra-satellite handover in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to intra-satellite handover, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may communicate in a first cell supported by a satellite, receive a list of a set of cells supported by the satellite, the set of cells including at least the first cell and a second cell supported by the satellite. The communications manager 815 may further determine a timing configuration of the first cell, receive an indication to transition to the second cell supported by the satellite, and transition from the first cell to communicating in the second cell supported by the satellite based on the indication and the timing configuration of the first cell. The communications manager 815 may also communicate in a first cell supported by a satellite and receive a list of a set of cells supported by the satellite, the set of cells including at least the first cell and a second cell supported by the satellite. Further, the communications manager 815 may determine a timing configuration of the first cell, determine to transition to the second cell supported by the satellite, and transmit an upstream transmission in the second cell supported by the satellite based on the determination to transition and the timing configuration of the first cell supported by the satellite.

The communications manager 815 may also communicate in a cell supported by a satellite using a first BWP of the cell, and receive configuration information for each of a set of BWPs of the cell, the set of BWPs including at least the first BWP and a second BWP of the cell. Additionally, the communications manager may receive, after receiving the configuration information for each of the set of BWPs of the cell, an indication to transition to the second BWP of the cell, and transition from using the first BWP of the cell to using the second BWP of the cell based on the indication and the configuration information for the second BWP of the cell. The communications manager 815 may also communicate in a cell supported by a satellite using a first BWP of the cell, and receive configuration information for each of a set of BWPs of the cell, the set of BWPs including at least the first BWP and a second BWP of the cell, In some instances, the communications manager 815 may also determine to transition to the second BWP of the cell, and transmit an upstream transmission using the second BWP of the cell based on the determining to transition and the configuration information for the second BWP of the cell. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field-programmable gate array (FPGA), or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
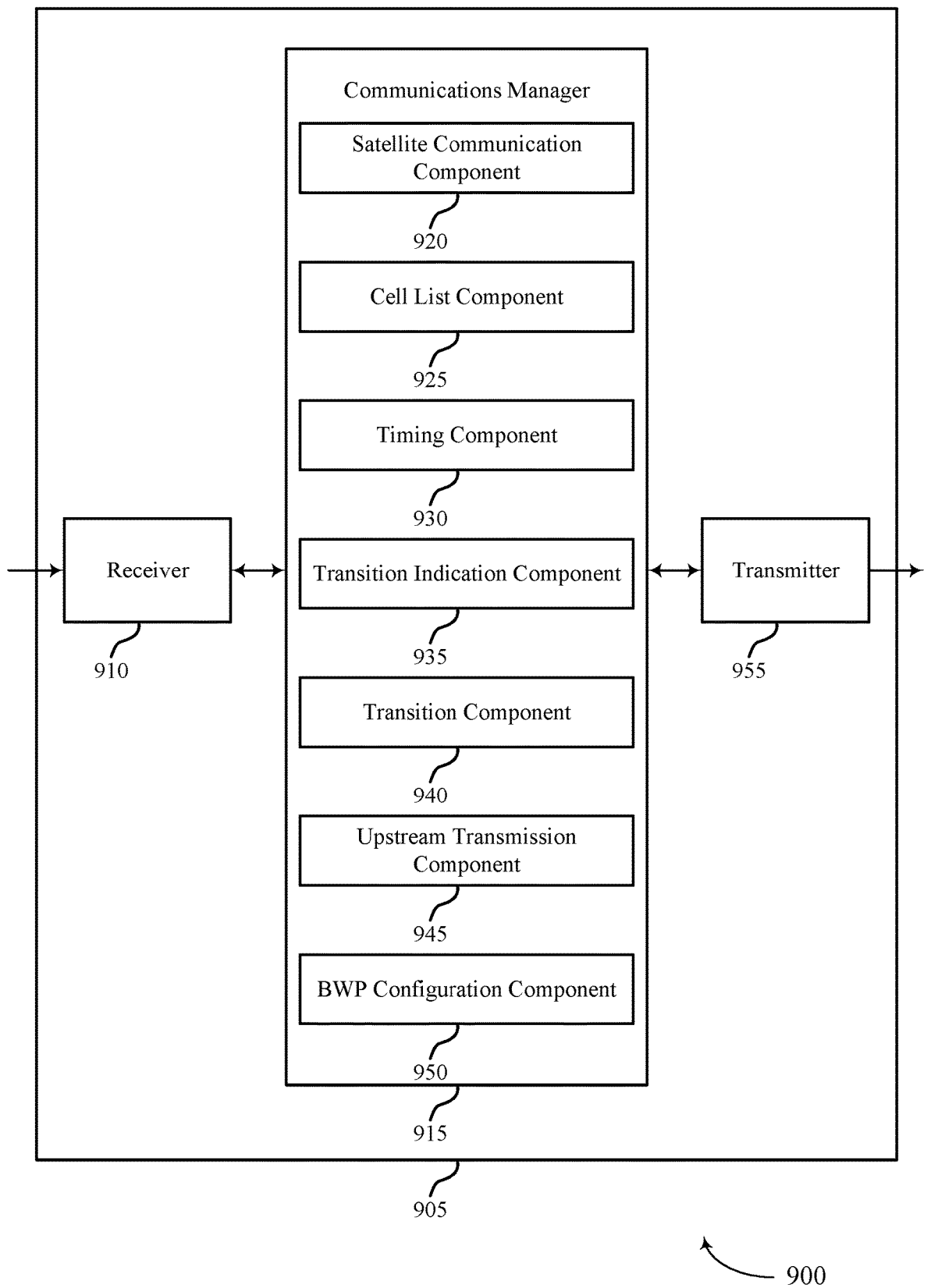

FIG. 9 shows a block diagram 900 of a device 905 that supports intra-satellite handover in accordance with aspects of the present disclosure. The device 905 may be an example of aspects of a device 805 or a UE 115 as described herein. The device 905 may include a receiver 910, a communications manager 915, and a transmitter 955. The device 905 may also include a processor. Each of these components may be in communication with one another (e.g., via one or more buses).

The receiver 910 may receive information such as packets, user data, or control information associated with various information channels (e.g., control channels, data channels, and information related to intra-satellite handover, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a satellite communication component 920, a cell list component 925, a timing component 930, a transition indication component 935, a transition component 940, an upstream transmission component 945, and a BWP configuration component 950. The communications manager 915 may be an example of aspects of the communications manager 1110 described herein.

The satellite communication component 920 may communicate in a first cell supported by a satellite. The satellite communication component 920 may communicate in a cell supported by a satellite using a first BWP of the cell. The cell list component 925 may receive a list of a set of cells supported by the satellite, the set of cells including at least the first cell and a second cell supported by the satellite. The timing component 930 may determine a timing configuration of the first cell.

The transition indication component 935 may receive an indication to transition to the second cell supported by the satellite. The transition indication component 935 may receive, after receiving the configuration information for each of the set of BWPs of the cell, an indication to transition to the second BWP of the cell.

The transition component 940 may determine to transition to the second cell supported by the satellite. The transition component 940 may transition from the first cell to communicating in the second cell supported by the satellite based on the indication and the timing configuration of the first cell. In some cases, the transition component 940 may determine to transition to the second BWP of the cell. The transition component 940 may transition from using the first BWP of the cell to using the second BWP of the cell based on the indication and the configuration information for the second BWP of the cell.

The upstream transmission component 945 may transmit an upstream transmission in the second cell supported by the satellite based on the determination to transition and the timing configuration of the first cell supported by the satellite. In some other examples, the upstream transmission component 945 may transmit an upstream transmission using the second BWP of the cell based on the determining to transition and the configuration information for the second BWP of the cell.

The BWP configuration component 950 may receive configuration information for each of a set of BWPs of the cell, the set of BWPs including at least the first BWP and a second BWP of the cell.

The transmitter 955 may transmit signals generated by other components of the device 905. In some examples, the transmitter 955 may be collocated with a receiver 910 in a transceiver module. For example, the transmitter 955 may be an example of aspects of the transceiver 1120 described with reference to FIG. 11. The transmitter 955 may utilize a single antenna or a set of antennas.

Figure 10:
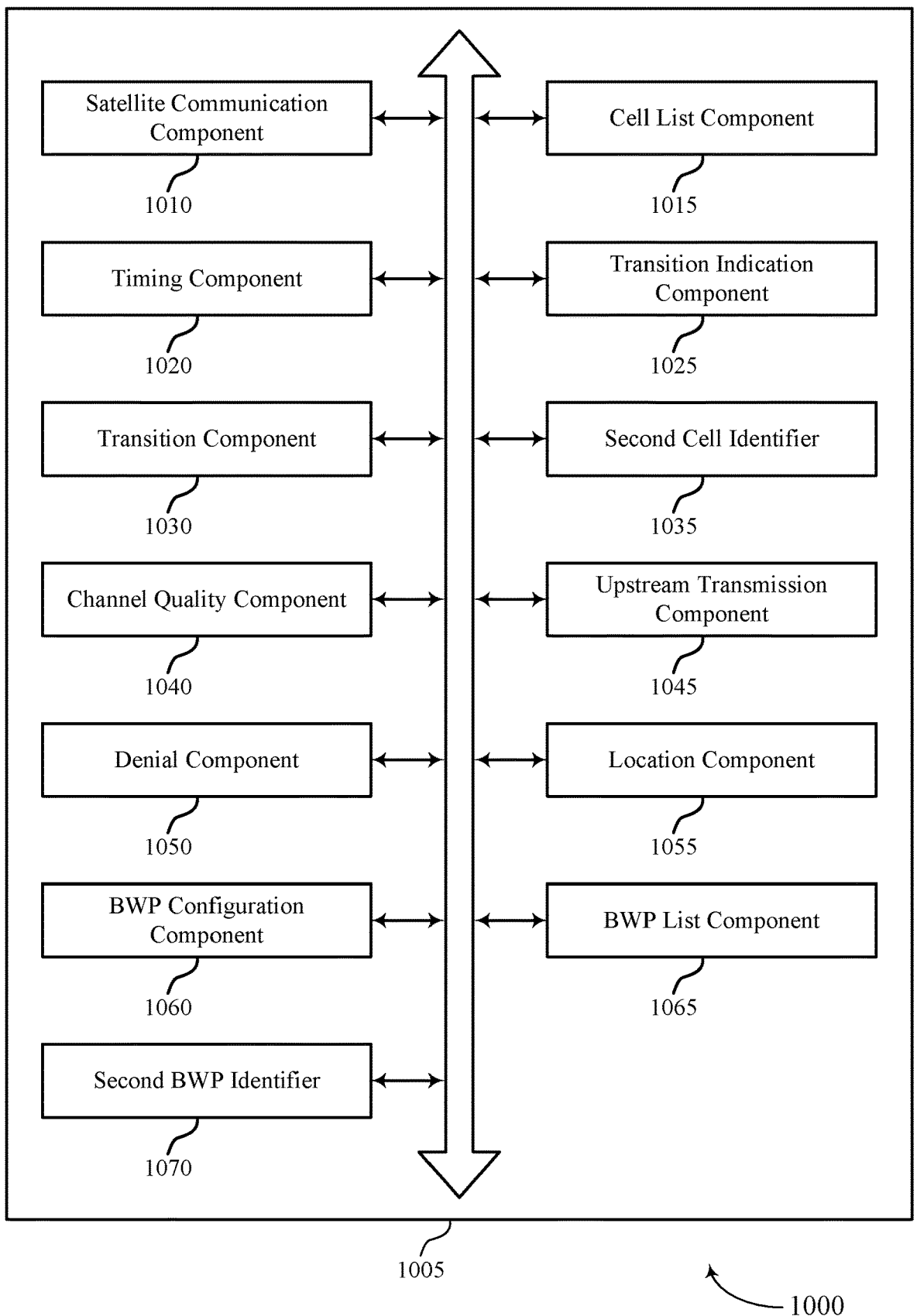
FIG. 10 shows a block diagram of a communications manager that supports intra-satellite handover in accordance with aspects of the present disclosure.

FIG. 10 shows a block diagram 1000 of a communications manager 1005 that supports intra-satellite handover in accordance with aspects of the present disclosure. The communications manager 1005 may be an example of aspects of a communications manager 815, a communications manager 915, or a communications manager 1110 described herein. The communications manager 1005 may include a satellite communication component 1010, a cell list component 1015, a timing component 1020, a transition indication component 1025, a transition component 1030, a second cell identifier 1035, a channel quality component 1040, an upstream transmission component 1045, a denial component 1050, a location component 1055, a BWP configuration component 1060, a BWP list component 1065, and a second BWP identifier 1070. Each of these modules may communicate, directly or indirectly, with one another (e.g., via one or more buses).

The satellite communication component 1010 may communicate in a first cell supported by a satellite. In some examples, the satellite communication component 1010 may receive, via a downstream control channel, a grant for a shared channel that includes a cell ID for one of the set of cells supported by the satellite. In some examples, the satellite communication component 1010 may communicate in a cell supported by a satellite using a first BWP of the cell. In some examples, the satellite communication component 1010 may receive, via a downstream control channel, a grant for a shared channel, where the grant includes an identifier of the second BWP of the cell. In some examples, the satellite communication component 1010 may communicate in the second cell based on determining the absence of the denial. In some other examples, the satellite communication component 1010 may transition from the second cell to communicating in the first cell supported by the satellite based on the determination to return and the timing configuration of the first cell.

In some examples, the satellite communication component 1010 may use the second BWP of the cell for both upstream and downstream communications based on the indication to transition to the second BWP of the cell. In some examples, the satellite communication component 1010 may transmit, to the satellite while using the first BWP of the cell, the channel quality information for the second BWP of the cell.

The cell list component 1015 may receive a list of a set of cells supported by the satellite, the set of cells including at least the first cell and a second cell supported by the satellite. In some examples, the cell list component 1015 may receive an ordered sequence of cells within the set of cells supported by the satellite. In some examples, the cell list component 1015 may receive, from the satellite and prior to receiving the indication to transition to the second cell, an indication of a frequency of the second cell, where transitioning from the first cell to communicating in the second cell supported by the satellite may be based on the indication of the frequency of the second cell. In some examples, the cell list component 1015 may receive an indication of a time limit for communications within the first cell. In some examples, the cell list component 1015 may receive an ordered sequence of cells within the set of cells supported by the satellite. In some cases, the first cell corresponds to a first beam transmitted by the satellite. In some cases, the second cell corresponds to a second beam transmitted by the satellite. In some cases, the first cell corresponds to a first set of one or more beams transmitted by the satellite at a first frequency. In some cases, the second cell corresponds to a second set of one or more beams transmitted by the satellite at a second frequency.

The timing component 1020 may determine a timing configuration of the first cell. In some examples, the timing component 1020 may receive a synchronization signal for the first cell, where determining the timing configuration of the first cell may be based on the synchronization signal for the first cell. In some examples, the timing component 1020 may determine a timing configuration of an upstream control channel of the second cell based on the timing configuration of the first cell.

The transition indication component 1025 may receive an indication to transition to the second cell supported by the satellite. In some examples, the transition indication component 1025 may receive, after receiving the configuration information for each of the set of BWPs of the cell, an indication to transition to the second BWP of the cell. In some examples, the transition indication component 1025 may receive a MAC-CE that includes a cell ID for the second cell.

In some examples, the transition indication component 1025 may receive an indication of a time limit for communications within the first cell. In some examples, the transition indication component 1025 may receive an indication of a time limit for communications using the first BWP of the cell, where the indication of the time limit includes the indication to transition to the second BWP of the cell. In some examples, the transition indication component 1025 may receive the indication to transition to the second BWP of the cell via at least one of RRC signaling or a MAC-CE.

The transition component 1030 may transition from the first cell to communicating in the second cell supported by the satellite based on the indication and the timing configuration of the first cell. In some examples, the transition component 1030 may determine to transition to the second cell supported by the satellite. In some examples, the transition component 1030 may determine to transition to the second cell based on the time limit and the ordered sequence. In some examples, the transition component 1030 may determine to transition to the second cell based on the location. In some examples, the transition component 1030 may determine to transition to the second cell supported by the satellite based on the channel quality associated with the second cell.

In some examples, the transition component 1030 may transition from using the first BWP of the cell to using the second BWP of the cell based on the indication and the configuration information for the second BWP of the cell. In some examples, the transition component 1030 may determine to transition to the second BWP of the cell. In some examples, determining to transition to the second BWP of the cell includes determining to transitioning from using the first pair of downstream and upstream BWPs to using the second pair of downstream and upstream BWPs. In some examples, transitioning from using the first BWP of the cell to using the second BWP of the cell includes transitioning from using the first pair of downstream and upstream BWPs to using the second pair of downstream and upstream BWPs based on the indication to transition to the second BWP of the cell. In some examples, the transition component 1030 may determine to transition to the second BWP of the cell based on the time limit and the ordered sequence. In some examples, the transition component 1030 may determine to transition to the second BWP of the cell based on the location. In some examples, the transition component 1030 may determine to transition to the second BWP of the cell based on the channel quality associated with the second BWP of the cell.

The second cell identifier 1035 may determine that the grant for the shared channel includes a cell ID for the second cell. In some examples, the second cell identifier 1035 may identify the second cell based on the ordered sequence.

The channel quality component 1040 may transmit, to the satellite while communicating in the first cell, channel quality information regarding the first cell and the second cell supported by the satellite. In some examples, the channel quality component 1040 may monitor, while communicating in the first cell, a channel quality associated with the second cell supported by the satellite. In some examples, the channel quality component 1040 may determine, while using the first BWP of the cell, channel quality information for the second BWP of the cell. In some examples, the channel quality component 1040 may monitor, while using the first BWP of the cell, a channel quality associated with the second BWP of the cell.

The upstream transmission component 1045 may transmit an upstream transmission in the second cell supported by the satellite based on the determination to transition and the timing configuration of the first cell supported by the satellite. In some examples, the upstream transmission component 1045 may transmit an access request via the upstream control channel of the second cell. In some examples, transmitting the access request includes at least one of a UE ID, an ID for the first cell, or a cell ID for the second cell. In some examples, the upstream transmission component 1045 may transmit an upstream transmission using the second BWP of the cell based on the determining to transition and the configuration information for the second BWP of the cell. In some examples, the upstream transmission component 1045 may transmit an access request via the upstream control channel of the second BWP of the cell. In some examples, transmitting the access request includes at least one of a UE ID, a BWP ID for the first BWP, or a BWP ID for the second BWP. In some examples, the upstream transmission component 1045 may transmit a grant-free transmission via the upstream shared channel of the second BWP of the cell.

The denial component 1050 may monitor a downstream control channel of the second cell for a denial of access to the second cell. In some examples, the denial component 1050 may determine an absence of the denial. In some examples, the denial component 1050 may receive, via a downstream control channel of the second cell supported by the satellite, a denial of access to the second cell. In some examples, the denial component 1050 may determine to return to the first cell supported by the satellite based on receiving the denial. In some examples, the denial component 1050 may receive a downstream control message that includes at least one of a denial message or an allocation of shared resources that grants no resources to a device performing the method. In some examples, the denial component 1050 may monitor, for a duration after transmitting the upstream transmission in the second cell, a downstream control channel of the second cell for a grant of resources of a shared channel of the second cell. In some examples, the denial component 1050 may determine an absence of the grant from the downstream control channel during the duration.

The location component 1055 may determine a location of at least one of the satellite or the UE.

The BWP configuration component 1060 may receive configuration information for each of a set of BWPs of the cell, the set of BWPs including at least the first BWP and a second BWP of the cell. In some examples, the BWP configuration component 1060 may determine a configuration of an upstream control channel of the second BWP of the cell based on the configuration information for the second BWP of the cell. In some examples, the BWP configuration component 1060 may determine a configuration of an upstream shared channel of the second BWP of the cell based on the configuration information for the second BWP of the cell.

The BWP list component 1065 may receive an ordered sequence of BWPs of the cell. In some examples, the BWP list component 1065 may receive an indication of a time limit for communications using the first BWP of the cell. In some cases, the first BWP of the cell may be one of a first set of BWPs, the first set of BWPs including a first pair of downstream and upstream BWPs. In some cases, the second BWP of the cell may be one of a second set of BWPs, the second set of BWPs including a second pair of downstream and upstream BWPs. In some cases, the first BWP of the cell corresponds to a first beam transmitted by the satellite at a first frequency. In some cases, the second BWP of the cell corresponds to a second beam transmitted by the satellite at a second frequency. In some cases, the cell includes all beams transmitted by the satellite.

The second BWP identifier 1070 may identify the second BWP of the cell based on the ordered sequence.

Figure 11:
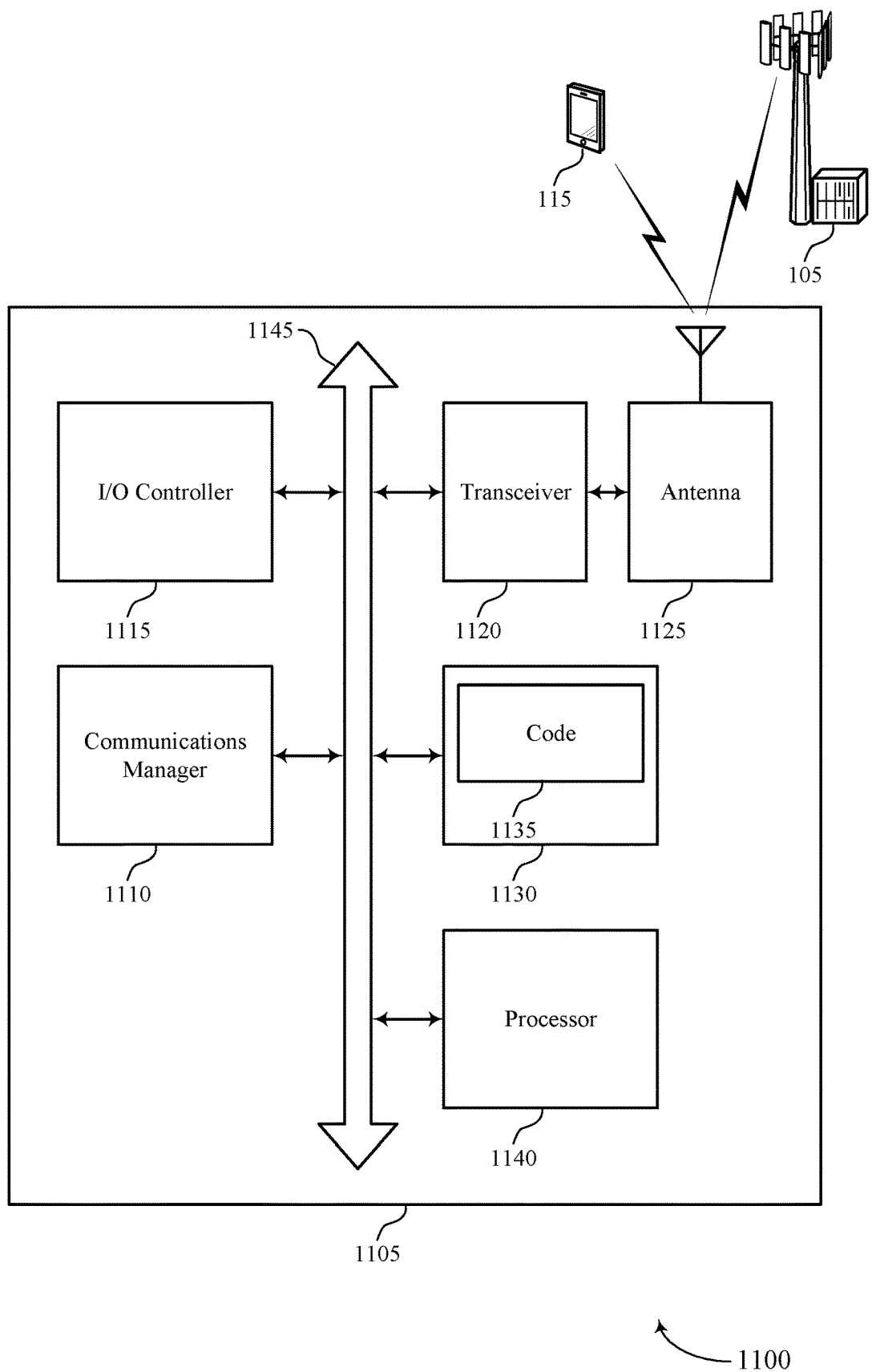
FIG. 11 shows a diagram of a system including a device that supports intra-satellite handover in accordance with aspects of the present disclosure.

FIG. 11 shows a diagram of a system 1100 including a device 1105 that supports intra-satellite handover in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may communicate in a first cell supported by a satellite, and receive a list of a set of cells supported by the satellite, the set of cells including at least the first cell and a second cell supported by the satellite. Communications manager 1110 may further determine a timing configuration of the first cell. In some cases, communications manager 1110 may receive an indication to transition to the second cell supported by the satellite, and transition from the first cell to communicating in the second cell supported by the satellite based on the indication and the timing configuration of the first cell. In some other cases, communications manager 1110 may determine to transition to the second cell supported by the satellite, and transmit an upstream transmission in the second cell supported by the satellite based on the determination to transition and the timing configuration of the first cell supported by the satellite.

The communications manager 1110 may also communicate in a cell supported by a satellite using a first BWP of the cell, and receive configuration information for each of a set of BWPs of the cell, the set of BWPs including at least the first BWP and a second BWP of the cell. Further, the communications manager 1110 may receive, after receiving the configuration information for each of the set of BWPs of the cell, an indication to transition to the second BWP of the cell, and transition from using the first BWP of the cell to using the second BWP of the cell based on the indication and the configuration information for the second BWP of the cell. In some examples, the communications manager 1110 may determine to transition to the second BWP of the cell, and transmit an upstream transmission using the second BWP of the cell based on the determining to transition and the configuration information for the second BWP of the cell.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting intra-satellite handover).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
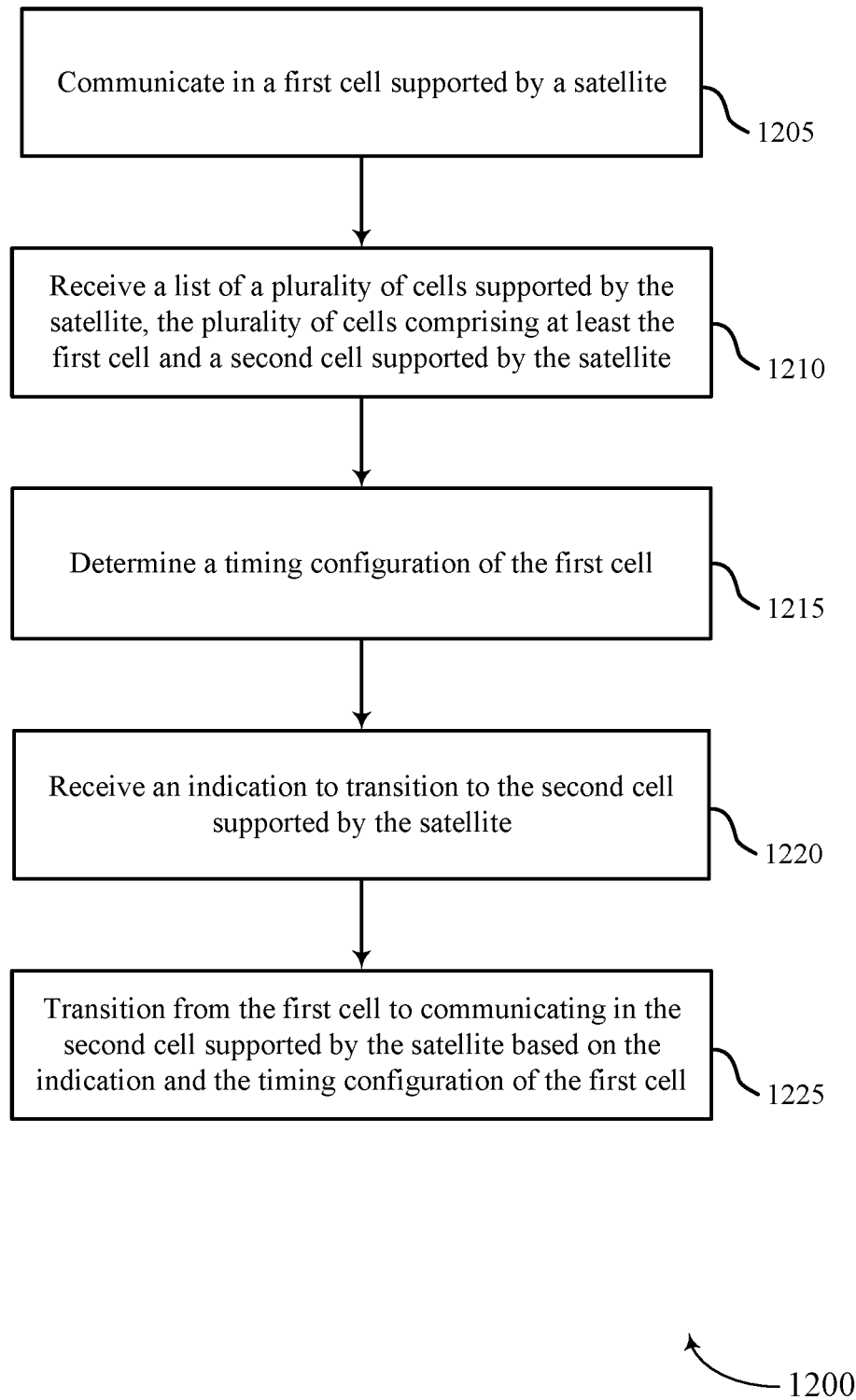
FIGS. 12 through 18 show flowcharts illustrating methods that support intra-satellite handover in accordance with aspects of the present disclosure.

FIG. 12 shows a flowchart illustrating a method 1200 that supports intra-satellite handover in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may communicate in a first cell supported by a satellite. The operations of 1205 may be performed according to the methods described herein. In some examples, aspects of the operations of 1205 may be performed by a satellite communication component as described with reference to FIGS. 8 through 11.

At 1210, the UE may receive a list of a set of cells supported by the satellite, the set of cells including at least the first cell and a second cell supported by the satellite. The operations of 1210 may be performed according to the methods described herein. In some examples, aspects of the operations of 1210 may be performed by a cell list component as described with reference to FIGS. 8 through 11.

At 1215, the UE may determine a timing configuration of the first cell. The operations of 1215 may be performed according to the methods described herein. In some examples, aspects of the operations of 1215 may be performed by a timing component as described with reference to FIGS. 8 through 11.

At 1220, the UE may receive an indication to transition to the second cell supported by the satellite. The operations of 1220 may be performed according to the methods described herein. In some examples, aspects of the operations of 1220 may be performed by a transition indication component as described with reference to FIGS. 8 through 11.

At 1225, the UE may transition from the first cell to communicating in the second cell supported by the satellite based on the indication and the timing configuration of the first cell. The operations of 1225 may be performed according to the methods described herein. In some examples, aspects of the operations of 1225 may be performed by a transition component as described with reference to FIGS. 8 through 11.

Figure 13:
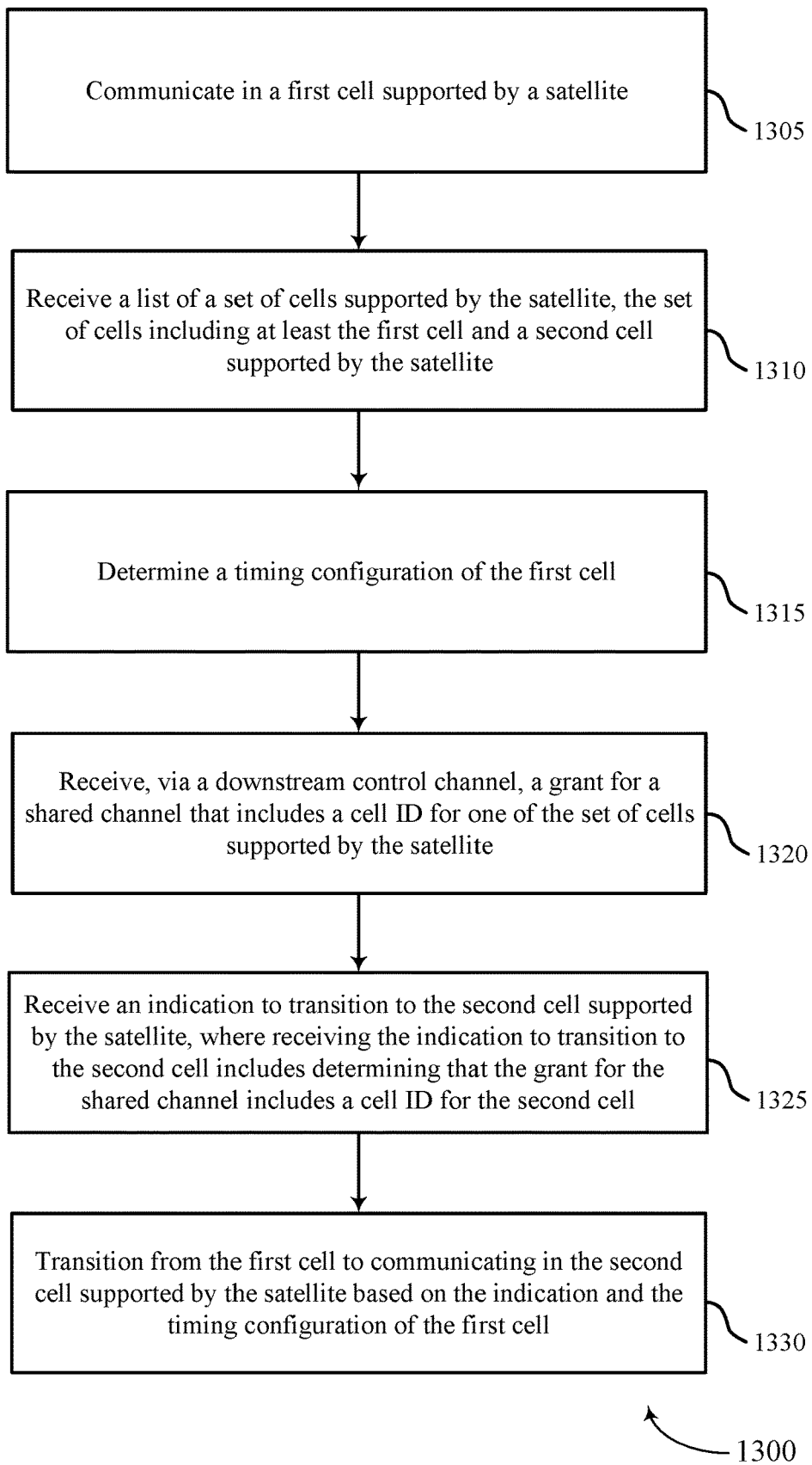

FIG. 13 shows a flowchart illustrating a method 1300 that supports intra-satellite handover in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may communicate in a first cell supported by a satellite. The operations of 1305 may be performed according to the methods described herein. In some examples, aspects of the operations of 1305 may be performed by a satellite communication component as described with reference to FIGS. 8 through 11.

At 1310, the UE may receive a list of a set of cells supported by the satellite, the set of cells including at least the first cell and a second cell supported by the satellite. The operations of 1310 may be performed according to the methods described herein. In some examples, aspects of the operations of 1310 may be performed by a cell list component as described with reference to FIGS. 8 through 11.

At 1315, the UE may determine a timing configuration of the first cell. The operations of 1315 may be performed according to the methods described herein. In some examples, aspects of the operations of 1315 may be performed by a timing component as described with reference to FIGS. 8 through 11.

At 1320, the UE may receive, via a downstream control channel, a grant for a shared channel that includes a cell ID for one of the set of cells supported by the satellite. The operations of 1320 may be performed according to the methods described herein. In some examples, aspects of the operations of 1320 may be performed by a satellite communication component as described with reference to FIGS. 8 through 11.

At 1325, the UE may receive an indication to transition to the second cell supported by the satellite, where receiving the indication to transition to the second cell includes determining that the grant for the shared channel includes a cell ID for the second cell. The operations of 1325 may be performed according to the methods described herein. In some examples, aspects of the operations of 1325 may be performed by a transition indication component as described with reference to FIGS. 8 through 11.

At 1330, the UE may transition from the first cell to communicating in the second cell supported by the satellite based on the indication and the timing configuration of the first cell. The operations of 1330 may be performed according to the methods described herein. In some examples, aspects of the operations of 1330 may be performed by a transition component as described with reference to FIGS. 8 through 11.

Figure 14:
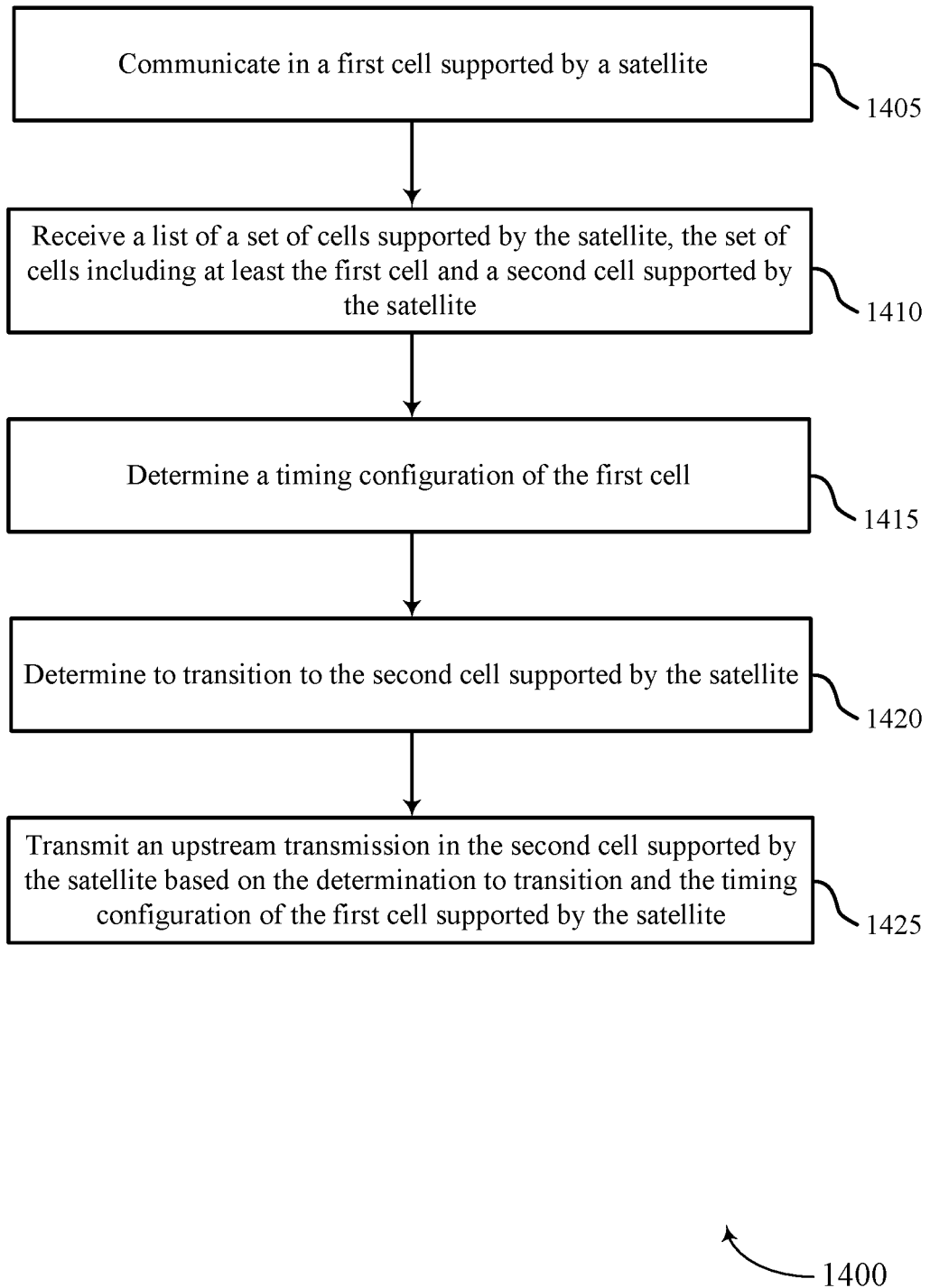

FIG. 14 shows a flowchart illustrating a method 1400 that supports intra-satellite handover in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may communicate in a first cell supported by a satellite. The operations of 1405 may be performed according to the methods described herein. In some examples, aspects of the operations of 1405 may be performed by a satellite communication component as described with reference to FIGS. 8 through 11.

At 1410, the UE may receive a list of a set of cells supported by the satellite, the set of cells including at least the first cell and a second cell supported by the satellite. The operations of 1410 may be performed according to the methods described herein. In some examples, aspects of the operations of 1410 may be performed by a cell list component as described with reference to FIGS. 8 through 11.

At 1415, the UE may determine a timing configuration of the first cell. The operations of 1415 may be performed according to the methods described herein. In some examples, aspects of the operations of 1415 may be performed by a timing component as described with reference to FIGS. 8 through 11.

At 1420, the UE may determine to transition to the second cell supported by the satellite. The operations of 1420 may be performed according to the methods described herein. In some examples, aspects of the operations of 1420 may be performed by a transition component as described with reference to FIGS. 8 through 11.

At 1425, the UE may transmit an upstream transmission in the second cell supported by the satellite based on the determination to transition and the timing configuration of the first cell supported by the satellite. The operations of 1425 may be performed according to the methods described herein. In some examples, aspects of the operations of 1425 may be performed by an upstream transmission component as described with reference to FIGS. 8 through 11.

Figure 15:
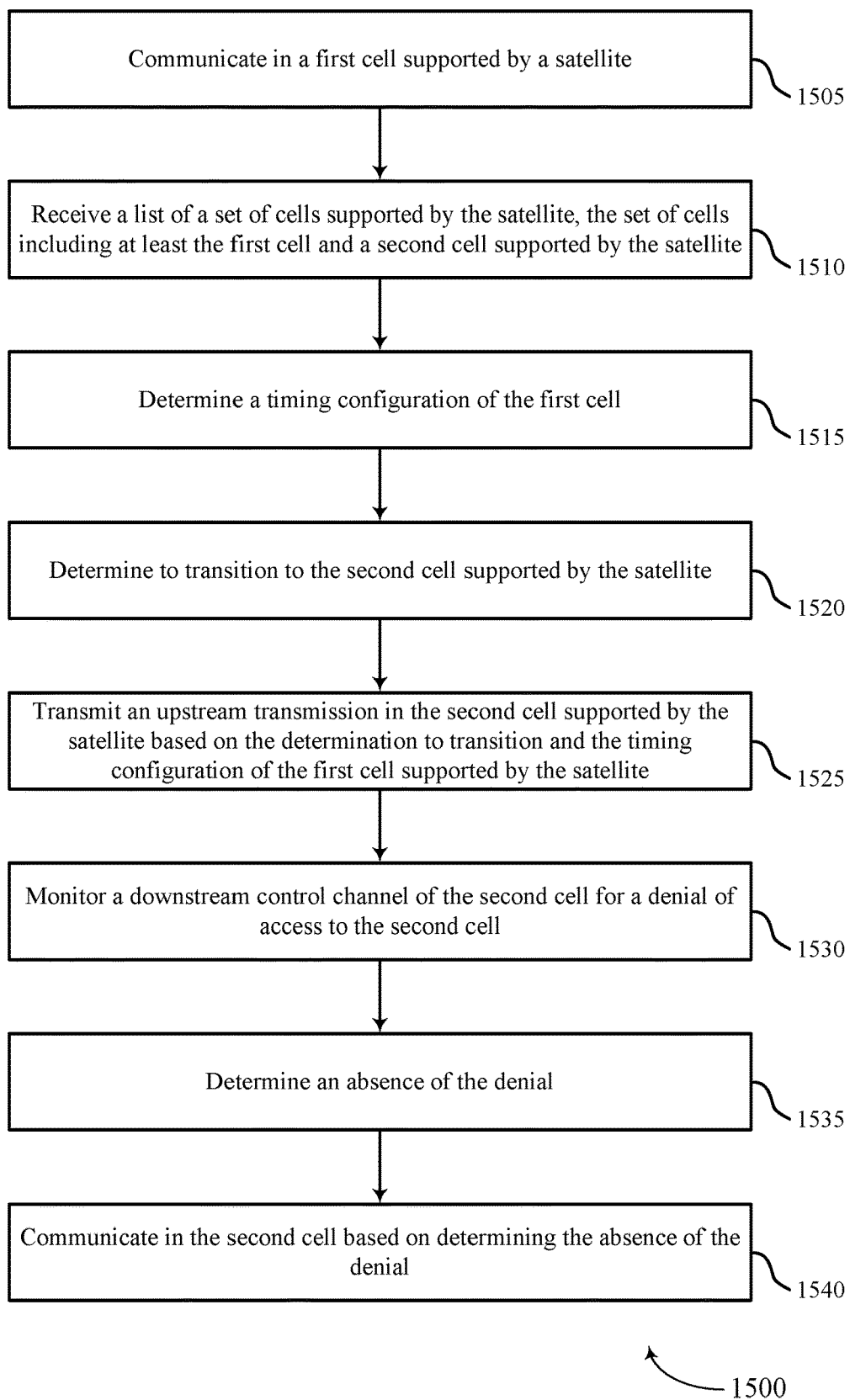

FIG. 15 shows a flowchart illustrating a method 1500 that supports intra-satellite handover in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1505, the UE may communicate in a first cell supported by a satellite. The operations of 1505 may be performed according to the methods described herein. In some examples, aspects of the operations of 1505 may be performed by a satellite communication component as described with reference to FIGS. 8 through 11.

At 1510, the UE may receive a list of a set of cells supported by the satellite, the set of cells including at least the first cell and a second cell supported by the satellite. The operations of 1510 may be performed according to the methods described herein. In some examples, aspects of the operations of 1510 may be performed by a cell list component as described with reference to FIGS. 8 through 11.

At 1515, the UE may determine a timing configuration of the first cell. The operations of 1515 may be performed according to the methods described herein. In some examples, aspects of the operations of 1515 may be performed by a timing component as described with reference to FIGS. 8 through 11.

At 1520, the UE may determine to transition to the second cell supported by the satellite. The operations of 1520 may be performed according to the methods described herein. In some examples, aspects of the operations of 1520 may be performed by a transition component as described with reference to FIGS. 8 through 11.

At 1525, the UE may transmit an upstream transmission in the second cell supported by the satellite based on the determination to transition and the timing configuration of the first cell supported by the satellite. The operations of 1525 may be performed according to the methods described herein. In some examples, aspects of the operations of 1525 may be performed by an upstream transmission component as described with reference to FIGS. 8 through 11.

At 1530, the UE may monitor a downstream control channel of the second cell for a denial of access to the second cell. The operations of 1530 may be performed according to the methods described herein. In some examples, aspects of the operations of 1530 may be performed by a denial component as described with reference to FIGS. 8 through 11.

At 1535, the UE may determine an absence of the denial. The operations of 1535 may be performed according to the methods described herein. In some examples, aspects of the operations of 1535 may be performed by a denial component as described with reference to FIGS. 8 through 11.

At 1540, the UE may communicate in the second cell based on determining the absence of the denial. The operations of 1540 may be performed according to the methods described herein. In some examples, aspects of the operations of 1540 may be performed by a satellite communication component as described with reference to FIGS. 8 through 11.

Figure 16:
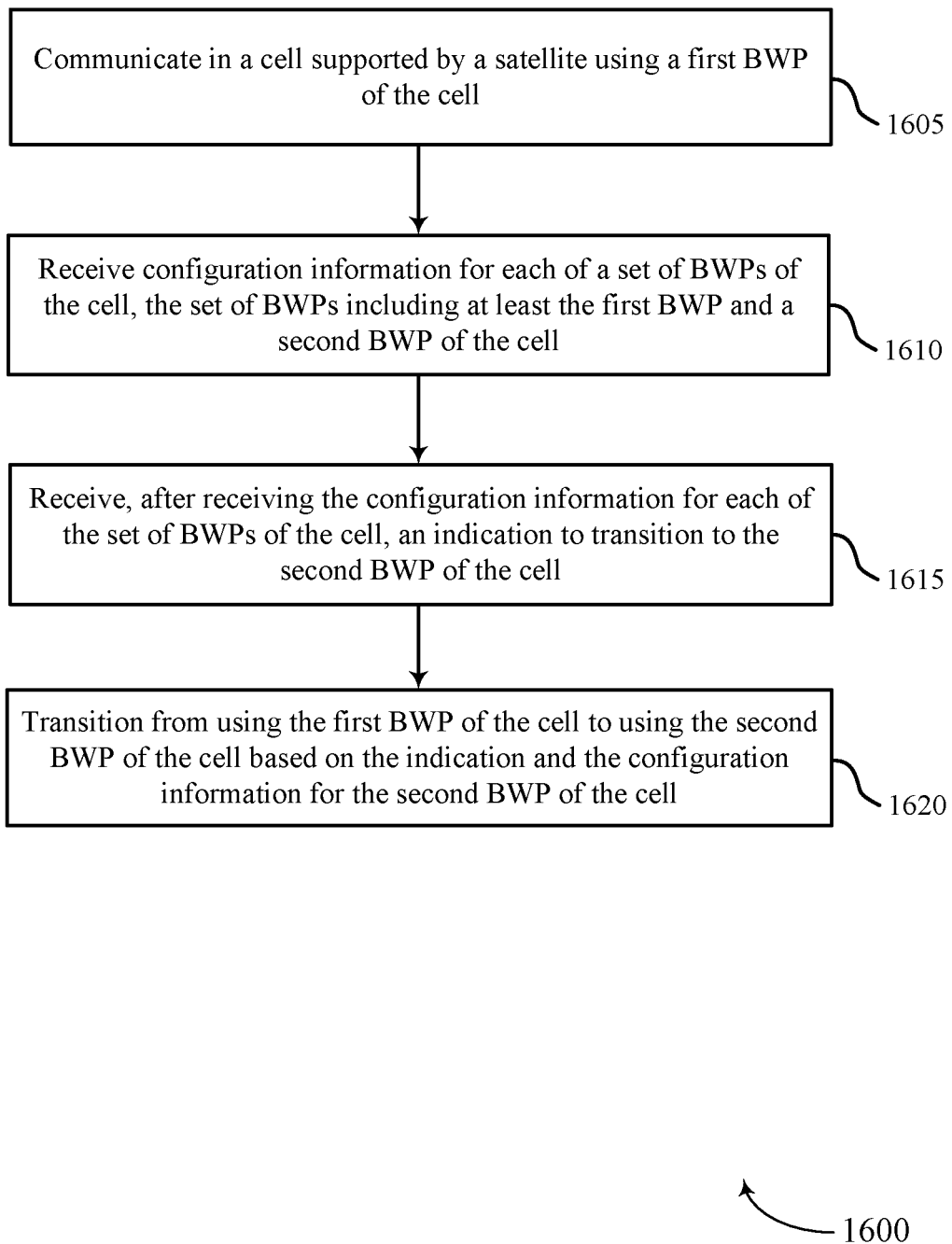

FIG. 16 shows a flowchart illustrating a method 1600 that supports intra-satellite handover in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may communicate in a cell supported by a satellite using a first BWP of the cell. The operations of 1605 may be performed according to the methods described herein. In some examples, aspects of the operations of 1605 may be performed by a satellite communication component as described with reference to FIGS. 8 through 11.

At 1610, the UE may receive configuration information for each of a set of BWPs of the cell, the set of BWPs including at least the first BWP and a second BWP of the cell. The operations of 1610 may be performed according to the methods described herein. In some examples, aspects of the operations of 1610 may be performed by a BWP configuration component as described with reference to FIGS. 8 through 11.

At 1615, the UE may receive, after receiving the configuration information for each of the set of BWPs of the cell, an indication to transition to the second BWP of the cell. The operations of 1615 may be performed according to the methods described herein. In some examples, aspects of the operations of 1615 may be performed by a transition indication component as described with reference to FIGS. 8 through 11.

At 1620, the UE may transition from using the first BWP of the cell to using the second BWP of the cell based on the indication and the configuration information for the second BWP of the cell. The operations of 1620 may be performed according to the methods described herein. In some examples, aspects of the operations of 1620 may be performed by a transition component as described with reference to FIGS. 8 through 11.

Figure 17:
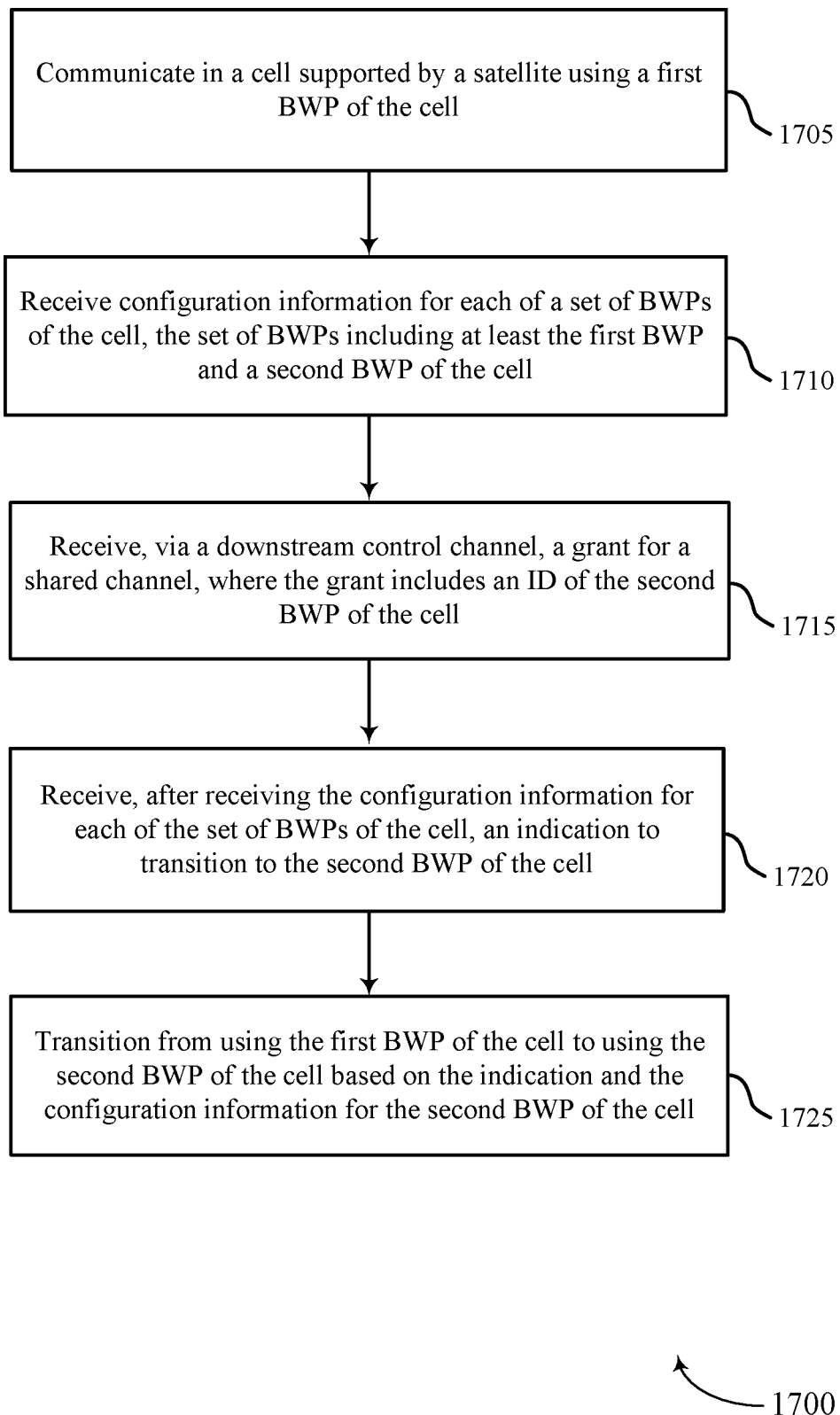

FIG. 17 shows a flowchart illustrating a method 1700 that supports intra-satellite handover in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may communicate in a cell supported by a satellite using a first BWP of the cell. The operations of 1705 may be performed according to the methods described herein. In some examples, aspects of the operations of 1705 may be performed by a satellite communication component as described with reference to FIGS. 8 through 11.

At 1710, the UE may receive configuration information for each of a set of BWPs of the cell, the set of BWPs including at least the first BWP and a second BWP of the cell. The operations of 1710 may be performed according to the methods described herein. In some examples, aspects of the operations of 1710 may be performed by a BWP configuration component as described with reference to FIGS. 8 through 11.

At 1715, the UE may receive, via a downstream control channel, a grant for a shared channel, where the grant includes an identifier of the second BWP of the cell. The operations of 1715 may be performed according to the methods described herein. In some examples, aspects of the operations of 1715 may be performed by a satellite communication component as described with reference to FIGS. 8 through 11.

At 1720, the UE may receive, after receiving the configuration information for each of the set of BWPs of the cell, an indication to transition to the second BWP of the cell. The operations of 1720 may be performed according to the methods described herein. In some examples, aspects of the operations of 1720 may be performed by a transition indication component as described with reference to FIGS. 8 through 11.

At 1725, the UE may transition from using the first BWP of the cell to using the second BWP of the cell based on the indication and the configuration information for the second BWP of the cell. The operations of 1725 may be performed according to the methods described herein. In some examples, aspects of the operations of 1725 may be performed by a transition component as described with reference to FIGS. 8 through 11.

Figure 18:
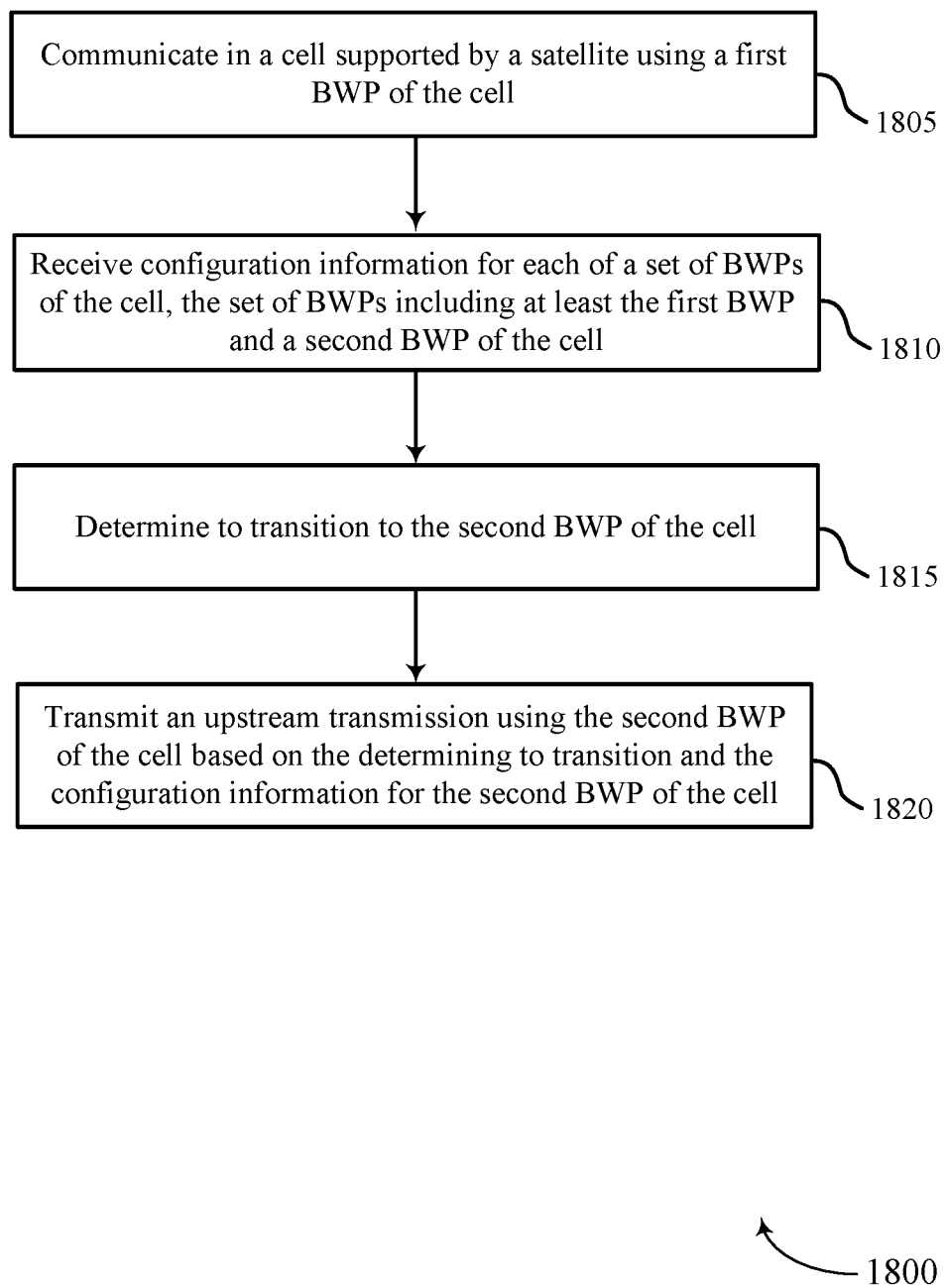

FIG. 18 shows a flowchart illustrating a method 1800 that supports intra-satellite handover in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may communicate in a cell supported by a satellite using a first BWP of the cell. The operations of 1805 may be performed according to the methods described herein. In some examples, aspects of the operations of 1805 may be performed by a satellite communication component as described with reference to FIGS. 8 through 11.

At 1810, the UE may receive configuration information for each of a set of BWPs of the cell, the set of BWPs including at least the first BWP and a second BWP of the cell. The operations of 1810 may be performed according to the methods described herein. In some examples, aspects of the operations of 1810 may be performed by a BWP configuration component as described with reference to FIGS. 8 through 11.

At 1815, the UE may determine to transition to the second BWP of the cell. The operations of 1815 may be performed according to the methods described herein. In some examples, aspects of the operations of 1815 may be performed by a transition component as described with reference to FIGS. 8 through 11.

At 1820, the UE may transmit an upstream transmission using the second BWP of the cell based on the determining to transition and the configuration information for the second BWP of the cell. The operations of 1820 may be performed according to the methods described herein. In some examples, aspects of the operations of 1820 may be performed by an upstream transmission component as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    communicating, by the UE, with a satellite via a first beam associated with a first frequency transmitted by the satellite;
    receiving, by the UE from the satellite, configuration information comprising a list of a plurality of beams transmitted by the satellite that are associated with a plurality of frequencies, the plurality of beams comprising at least the first beam and a second beam associated with a second frequency transmitted by the satellite, wherein the plurality of frequencies comprises at least the first frequency and the second frequency;
    receiving, by the UE from the satellite, a synchronization signal for the first beam, the synchronization signal indicating a timing configuration for communications between the UE and the satellite via the first beam, wherein the timing configuration indicates both an upstream timing configuration and a downstream timing configuration;
    determining, by the UE based at least in part on receiving the synchronization signal for the first beam, whether the timing configuration indicated via the synchronization signal for the communications between the UE and the satellite via the first beam associated with the first frequency is common for both the communications between the UE and the satellite via the first beam associated with the first frequency and for communications between the UE and the satellite via the second beam associated with the second frequency;
    receiving, by the UE from the satellite, an indication for the UE to perform a handover procedure to transition from communicating with the satellite via the first beam associated with the first frequency to communicating with the satellite via the second beam associated with the second frequency, the indication transmitted by the satellite based at least in part on a motion of the UE relative to the satellite; and
    after transitioning to the second beam, communicating, by the UE, with the satellite via the second beam while using the timing configuration that is common for the communications between the UE and the satellite via the first beam associated with the first frequency and for the communications between the UE and the satellite via the second beam associated with the second frequency, wherein the UE previously determined the timing configuration based at least in part on the synchronization signal received for the first beam.

2. The method of claim 1, further comprising:
    receiving, by the UE from the satellite via a downstream control channel, a grant for a shared channel that includes a beam identifier (ID) for one of the plurality of beams transmitted by the satellite.

3. The method of claim 2, wherein receiving the indication to transition from communicating with the satellite via the first beam to communicating with the satellite via the second beam comprises:
    determining, by the UE, that the grant for the shared channel includes a beam ID for the second beam associated with the second frequency.

4. The method of claim 1, wherein receiving the indication to transition from communicating with the satellite via the first beam to communicating with the satellite via the second beam comprises:
    receiving, by the UE from the satellite, a media access control (MAC) control element (MAC-CE) that includes a beam identifier (ID) for the second beam associated with the second frequency.

5. The method of claim 1, wherein receiving the indication to transition from communicating with the satellite via the first beam to communicating with the satellite via the second beam comprises:
    receiving, by the UE from the satellite, an indication of a time limit for the communications by the first beam associated with the first frequency.

6. The method of claim 5, wherein receiving the indication to transition from communicating with the satellite via the first beam associated with the first frequency to communicating with the satellite via the second beam associated with the second frequency further comprises:
    receiving, by the UE from the satellite, an ordered sequence of beams transmitted by the satellite; and
    identifying, by the UE, the second beam associated with the second frequency based at least in part on the ordered sequence of beams.

7. The method of claim 1, further comprising:
    receiving, by the UE from the satellite and prior to receiving the indication to transition from communicating with the satellite via the first beam associated with the first frequency to communicating with the satellite via the second beam, an indication of a frequency of the second beam that indicates that the second beam is associated with the second frequency, wherein communicating with the satellite via the second beam is based at least in part on the indication of the second frequency associated with the second beam.

8. The method of claim 1, further comprising:
    transmitting, by the UE to the satellite while communicating with the satellite via the first beam associated with the first frequency, channel quality information regarding the first beam associated with the first frequency and the second beam associated with the second frequency transmitted by the satellite.

9. The method of claim 1, wherein:
a first cell corresponds to a first set of one or more beams transmitted by the satellite at the first frequency, the first set of one or more beams comprising at least the first beam; and
a second cell corresponds to a second set of one or more beams transmitted by the satellite at the second frequency, the second set of one or more beams comprising at least the second beam.

10. A method for wireless communications at a user equipment (UE), comprising:
communicating, by the UE, with a satellite via a first beam associated with a first frequency;
receiving, by the UE from the satellite, configuration information comprising a list of a plurality of beams used by the satellite that are associated with a plurality of frequencies, the plurality of beams comprising at least the first beam and a second beam associated with a second frequency used by the satellite, wherein the plurality of frequencies comprises at least the first frequency and the second frequency;
receiving, by the UE from the satellite, a synchronization signal for the first beam, the synchronization signal indicating a timing configuration for communications between the UE and the satellite via the first beam, wherein the timing configuration indicates both an upstream timing configuration and a downstream timing configuration;
determining, by the UE based at least in part on receiving the synchronization signal for the first beam, whether the timing configuration indicated via the synchronization signal for the communications between the UE and the satellite via the first beam associated with the first frequency is common for both the communications between the UE and the satellite via the first beam associated with the first frequency and for communications between the UE and the satellite via the second beam associated with the second frequency;
determining, by the UE, to perform a handover procedure to transition from communicating with the satellite via the first beam associated with the first frequency to communicating with the satellite via the second beam associated with the second frequency based at least in part on a motion of the UE relative to the satellite; and
after transitioning to the second beam, transmitting, by the UE, an upstream transmission to the satellite via the second beam while using the timing configuration that is common for the communications between the UE and the satellite via the first beam associated with the first frequency and for the communications between the UE and the satellite via the second beam associated with the second frequency, wherein the upstream transmission is in accordance with the upstream timing configuration indicated via the timing configuration, and wherein the UE previously determined the timing configuration based at least in part on the synchronization signal received for the first beam.

11. The method of claim 10, wherein transmitting the upstream transmission comprises:
determining, by the UE, a timing configuration of an upstream control channel of the second beam based at least in part on the timing configuration for the communications with the satellite via the first beam and on the timing configuration indicating the upstream timing configuration; and
transmitting, by the UE to the satellite, an access request via the upstream control channel of the second beam.

12. The method of claim 11, wherein:
the access request comprises at least one of a UE identifier (ID), a beam ID for the first beam, or a beam ID for the second beam associated with the second frequency.

13. The method of claim 10, further comprising:
monitoring, by the UE, a downstream control channel of the second beam associated with the second frequency for a denial of access to the second beam, wherein the monitoring is in accordance with the downstream timing configuration indicated via the timing configuration;
determining, by the UE, an absence of the denial; and
communicating, by the UE, with the satellite via the second beam associated with the second frequency based at least in part on determining the absence of the denial.

14. The method of claim 10, further comprising:
receiving, by the UE and from the satellite via a downstream control channel of the second beam associated with the second frequency, a denial of access to the second beam in accordance with the downstream timing configuration indicated via the timing configuration;
determining, by the UE, to return to the first beam associated with the first frequency based at least in part on receiving the denial; and
communicating, by the UE, with the satellite via the first beam associated with the first frequency based at least in part on the determination to return and the timing configuration for the communications with the satellite via the first beam.

15. The method of claim 14, wherein receiving the denial comprises:
receiving, by the UE from the satellite, a downstream control message that includes at least one of a denial message or an allocation of shared resources that grants no resources to the UE, wherein the downstream control message is received in accordance with the downstream timing configuration indicated via the timing configuration.

16. The method of claim 14, wherein receiving the denial comprises:
monitoring, by the UE and for a duration after transmitting the upstream transmission via the second beam associated with the second frequency, the downstream control channel of the second beam for a grant of resources of a shared channel of the second beam, wherein the monitoring is in accordance with the downstream timing configuration indicated via the timing configuration; and
determining, by the UE, an absence of the grant from the downstream control channel during the duration.

17. The method of claim 10, further comprising:
receiving, by the UE from the satellite, an indication of a time limit for the communications via the first beam associated with the first frequency;
receiving, by the UE from the satellite, an ordered sequence of beams within the plurality of beams supported by the satellite; and
determining, by the UE, to transition from communicating with the satellite via the first beam associated with the first frequency to communicating with the satellite via the second beam associated with the second frequency based at least in part on the time limit and the ordered sequence of beams.

18. The method of claim 10, further comprising:
determining, by the UE, a location of at least one of the satellite or the UE; and
determining, by the UE, to transition from communicating with the satellite via the first beam associated with the first frequency to communicating with the satellite via the second beam associated with the second frequency based at least in part on the location.

19. The method of claim 10, further comprising:
monitoring, by the UE while communicating by the first beam associated with the first frequency, a channel quality associated with the second beam associated with the second frequency; and
determining, by the UE, to transition from communicating with the satellite via the first beam associated with the first frequency to communicating with the satellite via the second beam associated with the second frequency based at least in part on the channel quality associated with the second beam.

20. A method for wireless communications at a user equipment (UE), comprising:
communicating, by the UE, with a satellite using a first bandwidth part (BWP) of a cell comprising a plurality of BWPs, the first BWP being associated with a first frequency;
receiving, by the UE from the satellite while using the first BWP, configuration information for each of the plurality of BWPs of the cell, the plurality of BWPs comprising at least the first BWP and a second BWP of the cell, wherein the second BWP is associated with a second frequency, and wherein the configuration information comprises a frequency for each of the plurality of BWPs of the cell comprising at least the first frequency and the second frequency;
receiving, by the UE from the satellite and after receiving the configuration information for each of the plurality of BWPs of the cell, an indication to perform a handover procedure to transition from communicating with the satellite via the first BWP of the cell associated with the first frequency to communicating with the satellite via the second BWP of the cell associated with the second frequency based at least in part on a motion of the UE relative to the satellite; and
after transitioning to the second BWP associated with the second frequency, communicating, by the UE with the satellite using the second BWP of the cell while using a timing configuration that is common for both communications between the UE and the satellite via the first BWP associated with the first frequency and for communications between the UE and the satellite via the second BWP associated with the second frequency, the communicating further using the configuration information that the UE previously received for the second BWP while using the first BWP, wherein the timing configuration indicates both an upstream timing configuration and a downstream timing configuration.

21. The method of claim 20, wherein receiving the indication to transition from communicating with the satellite via the first BWP associated with the first frequency of the cell to communicating with the satellite via the second BWP associated with the second frequency of the cell comprises:
receiving, by the UE from the satellite via a downstream control channel, a grant for a shared channel, wherein the grant includes an identifier (ID) of the second BWP associated with the second frequency of the cell, wherein the grant for the shared channel is received in accordance with the downstream timing configuration indicated via the timing configuration.

22. The method of claim 20, wherein receiving the indication to transition from communicating with the satellite via the first BWP associated with the first frequency of the cell to communicating with the satellite via the second BWP associated with the second frequency of the cell comprises:
receiving, by the UE from the satellite, the indication to transition from communicating with the satellite via the first BWP associated with the first frequency of the cell to communicating with the satellite via the second BWP associated with the second frequency of the cell via at least one of radio resource control (RRC) signaling or a media access control (MAC) control element (MAC-CE).

23. The method of claim 20, further comprising:
receiving, by the UE from the satellite, an indication of a time limit for the communications using the first BWP associated with the first frequency of the cell, wherein the indication of the time limit comprises the indication to transition from communicating with the satellite via the first BWP of the cell to communicating with the satellite via the second BWP associated with the second frequency of the cell;
receiving, by the UE from the satellite, an ordered sequence of BWPs of the cell; and
identifying, by the UE, the second BWP associated with the second frequency of the cell based at least in part on the ordered sequence of BWPs.

24. The method of claim 20, wherein communicating with the satellite using the second BWP associated with the second frequency of the cell comprises:
using, by the UE, the second BWP associated with the second frequency of the cell for both upstream and downstream communications with the satellite in accordance with both the upstream timing configuration and the downstream timing configuration indicated via the timing configuration.

25. The method of claim 20, wherein:
the first BWP associated with the second frequency of the cell is one of a first set of BWPs, the first set of BWPs comprising a first pair of downstream and upstream BWPs;
communicating with the satellite using the first set of BWPs comprises using, by the UE, the first pair of downstream and upstream BWPs in accordance with the upstream timing configuration and the downstream timing configuration indicated via the timing configuration;
the second BWP associated with the second frequency of the cell is one of a second set of BWPs, the second set of BWPs comprising a second pair of downstream and upstream BWPs; and
communicating with the satellite using the second set of BWPs comprises using, by the UE, the second pair of downstream and upstream BWPs in accordance with the upstream timing configuration and the downstream timing configuration indicated via the timing configuration.

26. The method of claim 20, further comprising:
determining, by the UE while using the first BWP associated with the second frequency of the cell, channel quality information for the second BWP associated with the second frequency of the cell; and
transmitting, by the UE to the satellite while using the first BWP associated with the second frequency of the cell, the channel quality information for the second BWP associated with the second frequency of the cell.

27. The method of claim 20, wherein:
the first BWP associated with the second frequency of the cell corresponds to a first beam transmitted by the satellite at Flail the first frequency; and
the second BWP associated with the second frequency of the cell corresponds to a second beam transmitted by the satellite at DB the second frequency.

28. The method of claim 27, wherein the cell comprises all beams transmitted by the satellite.

29. A method for wireless communications at a user equipment (UE), comprising:
communicating, by the UE, with a satellite using a first bandwidth part (BWP) of a cell comprising a plurality of BWPs, the first BWP being associated with a first frequency;
receiving, by the UE from the satellite while using the first BWP, configuration information for each of the plurality of BWPs of the cell, the plurality of BWPs comprising at least the first BWP and a second BWP of the cell, wherein the second BWP is associated with a second frequency, and wherein the configuration information comprises a frequency for each of the plurality of BWPs of the cell comprising at least the first frequency and the second frequency;
determining, by the UE, to perform a handover procedure to transition from communicating with the satellite via the first BWP of the cell associated with the first frequency to communicating with the satellite via the second BWP of the cell associated with the second frequency based at least in part on a motion of the UE relative to the satellite; and
after transitioning to the second BWP associated with the second frequency, transmitting, by the UE, an upstream transmission to the satellite using the second BWP of the cell and a timing configuration that is common for both communications between the UE and the satellite via the first BWP associated with the first frequency and for communications between the UE and the satellite via the second BWP associated with the second frequency, the communicating further using the configuration information that the UE previously received for the second BWP while using the first BWP, wherein the timing configuration indicated both an upstream timing configuration and a downstream timing configuration, and wherein the upstream is in accordance with the upstream timing configuration indicated via the timing configuration.

30. The method of claim 29, wherein transmitting the upstream transmission comprises:
determining, by the UE, a configuration of an upstream control channel of the second BWP associated with the second frequency of the cell based at least in part on the configuration information for the second BWP of the cell; and
transmitting, by the UE to the satellite, an access request via the upstream control channel of the second BWP associated with the second frequency of the cell.

31. The method of claim 30, wherein:
the access request comprises at least one of a UE identifier (ID), a BWP ID for the first BWP associated with the first frequency, or a BWP ID for the second BWP associated with the second frequency.

32. The method of claim 29, wherein transmitting the upstream transmission comprises:
determining, by the UE, a configuration of an upstream shared channel of the second BWP associated with the second frequency of the cell based at least in part on the configuration information for the second BWP of the cell; and
transmitting, by the UE to the satellite, a grant-free transmission via the upstream shared channel of the second BWP associated with the second frequency of the cell.

33. The method of claim 29, further comprising:
receiving, by the UE from the satellite, an indication of a time limit for the communications using the first BWP associated with the first frequency of the cell;
receiving, by the UE from the satellite, an ordered sequence of the plurality of BWPs of the cell; and
determining, by the UE, to transition from communicating with the satellite via the first BWP associated with the first frequency of the cell to communicating with the satellite via the second BWP associated with the second frequency of the cell based at least in part on the time limit and the ordered sequence.

34. The method of claim 29, further comprising:
determining, by the UE, a location of at least one of the satellite or the UE; and
determining, by the UE, to transition from communicating with the satellite via the first BWP associated with the first frequency of the cell to communicating with the satellite via the second BWP associated with the second frequency of the cell based at least in part on the location.

35. The method of claim 29, further comprising:
monitoring, by the UE while communicating with the satellite using the first BWP of the cell, a channel quality associated with the second BWP of the cell; and
determining, by the UE, to transition from communicating with the satellite via the first BWP associated with the first frequency of the cell to communicating with the satellite via the second BWP associated with the second frequency of the cell based at least in part on the channel quality associated with the second BWP of the cell.

36. The method of claim 29, wherein:
the first BWP associated with the first frequency of the cell is one of a first set of BWPs, the first set of BWPs comprising a first pair of downstream and upstream BWPs;
the second BWP associated with the second frequency of the cell is one of a second set of BWPs, the second set of BWPs comprising a second pair of downstream and upstream BWPs; and
determining to transition from communicating with the satellite via the first BWP associated with the first frequency of the cell to communicating with the satellite via the second BWP associated with the second frequency of the cell comprises determining, by the UE, to transition from using the first pair of downstream and upstream BWPs to using the second pair of downstream and upstream BWPs.

37. The method of claim 29, wherein:
the first BWP associated with the first frequency of the cell corresponds to a first beam transmitted by the satellite via the first frequency; and
the second BWP associated with the second frequency of the cell corresponds to a second beam transmitted by the satellite via the second frequency.

* * * * *